US012135510B2

(12) United States Patent
Sakamaki et al.

(10) Patent No.: US 12,135,510 B2
(45) Date of Patent: Nov. 5, 2024

(54) DEVELOPING APPARATUS

(71) Applicant: CANON KABUSHIKI KAISHA, Tokyo (JP)

(72) Inventors: Tomoyuki Sakamaki, Toride (JP); Mitsuhiro Furukawa, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/085,827

(22) Filed: Dec. 21, 2022

(65) Prior Publication Data

US 2023/0195006 A1 Jun. 22, 2023

Related U.S. Application Data

(62) Division of application No. 17/570,641, filed on Jan. 7, 2022, now Pat. No. 11,567,426, which is a division of application No. 17/083,499, filed on Oct. 29, 2020, now Pat. No. 11,243,483, which is a division of application No. 15/646,324, filed on Jul. 11, 2017, now Pat. No. 10,852,661, which is a division of (Continued)

(30) Foreign Application Priority Data

Apr. 27, 2012 (JP) ................................ 2012-103804

(51) Int. Cl.
*G03G 15/08* (2006.01)
*G03G 15/09* (2006.01)

(52) U.S. Cl.
CPC ..... *G03G 15/0812* (2013.01); *G03G 15/0818* (2013.01); *G03G 15/09* (2013.01)

(58) Field of Classification Search
CPC .......... G03G 15/0812; G03G 15/0921; G03G 15/0928
See application file for complete search history.

(56) References Cited

U.S. PATENT DOCUMENTS 4,982,689 A 1/1991 Honda et al.
6,821,700 B2 11/2004 Lewis (Continued)

FOREIGN PATENT DOCUMENTS

JP 02-50182 A 2/1990
JP 05-249833 A 9/1993

(Continued)

OTHER PUBLICATIONS

Korean Office Action dated Jan. 8, 2016, in related Korean Patent Application No. 10-2014-7032403.

(Continued)

*Primary Examiner* — Jessica L Eley
(74) *Attorney, Agent, or Firm* — VENABLE LLP

(57) ABSTRACT

A developing apparatus for developing a latent image formed on an image bearing member includes a developer carrying member configured to carry a developer including toner and magnetic carrier and including a developer carrying surface having a plurality of grooves, a magnet, provided inside the developer carrying member, configured to attract the developer on the developing carrying surface, and a regulating member, provided spaced from the developer carrying member and configured to regulate an amount of the developer carried on the developer carrying surface.

11 Claims, 6 Drawing Sheets

Related U.S. Application Data application No. 14/382,404, filed as application No. PCT/JP2013/062880 on Apr. 26, 2013, now Pat. No. 9,760,037.

(56) References Cited

U.S. PATENT DOCUMENTS

| | | | | |
|---|---|---|---|---|
| 9,229,368 | B2 | 1/2016 | Okino et al. | |
| 2001/0048827 | A1* | 12/2001 | Okada ................ | G03G 15/0921 399/267 |
| 2002/0024924 | A1 | 2/2002 | Endoh et al. | |
| 2004/0126147 | A1* | 7/2004 | Kondo ............... | G03G 15/0921 399/277 |
| 2006/0062599 | A1 | 3/2006 | Shimmura et al. | |
| 2006/0204285 | A1 | 9/2006 | Zemba | |
| 2007/0110481 | A1 | 5/2007 | Yamada et al. | |
| 2009/0185838 | A1 | 7/2009 | Aruga et al. | |
| 2010/0098464 | A1 | 4/2010 | Suzuki et al. | |
| 2010/0150618 | A1 | 6/2010 | Kurebayashi et al. | |
| 2011/0069999 | A1 | 3/2011 | Oba et al. | |
| 2011/0158697 | A1 | 6/2011 | Iwata et al. | |
| 2012/0195647 | A1 | 8/2012 | Nose et al. | |
| 2012/0294655 | A1* | 11/2012 | Terasaka ............ | G03G 15/0921 399/279 |
| 2013/0108328 | A1* | 5/2013 | Ariizumi ............ | G03G 15/0928 399/276 |
| 2013/0136506 | A1 | 5/2013 | Sakamaki | |
| 2015/0277285 | A1 | 10/2015 | Okino et al. | |

FOREIGN PATENT DOCUMENTS

| | | | |
|---|---|---|---|
| JP | 2004-021122 | A | 1/2004 |
| JP | 2004-029574 | A | 1/2004 |
| JP | 2006-251354 | A | 9/2006 |
| JP | 2007-108782 | A | 4/2007 |
| JP | 2007-114317 | A | 5/2007 |
| JP | 2007-328193 | A | 12/2007 |
| JP | 2008-015197 | A | 1/2008 |
| JP | 2008-090284 | A | 4/2008 |
| JP | 2008-139585 | A | 6/2008 |
| JP | 2009-244596 | A | 10/2009 |
| JP | 2009-282311 | A | 12/2009 |
| JP | 2010-097191 | A | 4/2010 |
| RU | 2564515 | C2 | 10/2015 |

OTHER PUBLICATIONS

European Search Repori dated Jan. 5, 2016, in related European Patent Application No. 13781079.2.

Russian Notice of Allowance dated Nov. 16, 2015, in related Russian Patent Application No. 2014147686.

Notification of Transmittal of the International Search Report and The Written Opinion of the International Searching Authority mailed Jul. 9, 2013.

Russian Notice of Allowance dated Jun. 28, 2017, in related Russian Patent Application No. 2016110402/28 (with English translation).

Indian Office Action dated Feb. 28, 2018, in related Indian Patent Application No. 8390/CHENP/2014.

Chinese Office Action dated Feb. 9, 2018, in related Chinese Patent Application No. 201380021159.5 (with English translation).

European Search Repori dated Jul. 16, 2020, in related European Patent Application No. 20158783.9.

European Search Report dated Aug. 3, 2020, in related European Patent Application No. 20158785.4.

* cited by examiner

DEVELOPING APPARATUS

CROSS REFERENCE TO RELATED APPLICATIONS

The present application is a divisional of U.S. application Ser. No. 17/570,641 filed Jan. 7, 2022, which is a divisional of application Ser. No. 17/083,499, filed Oct. 29, 2020, now U.S. Pat. No. 11,243,483, issued Feb. 8, 2022, which is a divisional of application Ser. No. 15/646,324, filed Jul. 11, 2017, now U.S. Pat. No. 10,852,661, issued Dec. 1, 2020, which is a divisional of application Ser. No. 14/382,404, filed Sep. 2, 2014, now U.S. Pat. No. 9,760,037, issued Sep. 12, 2017, which is a continuation application under 37 C.F.R. § 371 of International Application No. PCT/JP2013/062880, filed on Apr. 26, 2013, which claims priority to Japanese Patent Application No. 2012-103804 filed on Apr. 27, 2012.

TECHNICAL FIELD

The present invention relates to a developing apparatus (device) which is employed by an image forming apparatus such as a copying machine, a printer, a recorded image displaying apparatus, a facsimile machine, etc., in order to develop an electrostatic latent image formed on an image bearing member with the use of an electrophotographic method, an electrostatic recording method, or the like, into a visible image. In particular, it relates to the developer bearing member of a developing apparatus (device) which uses two-component developer made up of toner and magnetic carrier.

BACKGROUND ART

An image forming apparatus, such as a copying machine, that uses an electrophotographic image formation method, adheres developer to an electrostatic latent image it forms on its image bearing member, such as a photosensitive drum, in order to develop the electrostatic latent image into a visible image. Some developing devices in accordance with the prior art have been known to use two-component developer made up of toner and magnetic carrier. These developing devices have been also known to use a method which develops an electrostatic latent image on their image bearing member (photosensitive drum), into a visible image, with the toner in the two-component developer, by conveying the developer to the immediate adjacencies of the image bearing member, with the use of their rotatable developer bearing member (which hereafter may be referred to simply as development sleeve) while keeping the two-component developer magnetically adhered to the developer bearing member.

Generally, these developing devices are provided with a development sleeve, a stationary magnet, and a developer regulating blade (which hereafter may be referred to simply as regulation blade). The stationary magnet is placed in the development sleeve to magnetically hold developer to the peripheral surface of the development sleeve. The regulation blade is positioned in the adjacencies of the development sleeve, with the presence of a preset amount of gap between itself and the peripheral surface of the development sleeve. Thus, the two-component developer is borne on the development sleeve, and is conveyed to the immediate adjacencies of the photosensitive member while being regulated in the amount to a preset value.

Conventionally, it has been a common practice to employ a development sleeve, the peripheral surface of which has microscopic peaks and valleys formed by blasting (sandblasting) with the use of microscopic particles, or multiple microscopic grooves which extend in parallel to the rotational axis of the development sleeve, in order to ensure that developer is reliably conveyed to the adjacencies of the peripheral surface of the photosensitive member.

However, a development sleeve, the peripheral surface of which has microscopic peaks and valleys formed by sandblasting is problematic in that if the microscopic peaks and valleys are smaller in dimension than a certain value, it is insufficient in performance in terms of developer conveyance. On the other hand, if a development sleeve needs to be increased in the dimension of the peaks and valleys of its peripheral surface, for the sake of increasing the development sleeve in developer conveyance performance, the process of sandblasting the peripheral surface of the development sleeve has to be increased in the intensity with which blasting particles are blasted upon the peripheral surface of the development sleeve, which is problematic in that the blasting process may deform the development sleeve. Generally, therefore, the sandblasted development sleeves which are currently in use are relatively small in the dimension of the peaks and valleys of their peripheral surface. However, in the case of a development sleeve which is small in the dimension of the peaks and valleys of its peripheral surface, its peaks and valleys are relatively quickly worn away by friction, compared to a development roller having relatively large peaks and valleys on its peripheral surface, while it is used for development for a substantial length of time, being therefore problematic in that it is not stable in the developer conveyance performance. This problem may become one of the reasons why a developing device is prematurely reduced in service life.

In recent years, an extremely high level of image quality, reliability, and stability have come to be required of a copying machine and a printer. From the standpoint of satisfying these requirements, it is very important to keep a development sleeve stable in the amount by which it conveys developer.

Thus, development sleeves having multiple grooves which extend in parallel to their axis have been proposed. One of such development sleeves is disclosed in Japanese Laid-open Patent Application H02-50182 (patent document 1). Unlike the method which uses sandblasting to provide the peripheral surface of a development sleeve with microscopic peaks and valleys, forming the abovementioned grooves in the peripheral surface of a development sleeve by putting a development sleeve through a die can provide the peripheral surface of the development sleeve with relatively large grooves (peaks and valleys), without causing the development sleeve to deform. Therefore, a development sleeve, the peripheral surface of which is provided with microscopic grooves with the use of a die is less likely to be affected by friction, being therefore more stable in developer conveyance performance, than a development sleeve, the peripheral surface of which has been sandblasted.

A development sleeve, the peripheral surface of which is provided with grooves is stable in terms of developer conveyance performance, but is problematic in that it requires the gap between itself and the aforementioned developer regulation blade to be relatively small, for the following reason. That is, providing the peripheral surface of a development roller with grooves can make the development sleeve stable in developer conveyance performance, but, it may make the development sleeve excessive in developer conveyance performance. Thus, it may require the gap between the development sleeve and regulation blade to be made relatively small to compensate for the excessive amount by which developer is conveyed by the development sleeve, because unless the gap is reduced, the development roller becomes excessive in the amount of the developer thereon.

Further, in recent years, an extremely high level of image quality has come to be required of an image forming apparatus. Therefore, in order to prevent, as much as possible, an image forming apparatus from becoming worse in the graininess attributable to the friction between the developer on a development sleeve and the toner image formed on the peripheral surface of a photosensitive member, there is a trend to reduce a developing device in the amount by which developer is borne by the peripheral surface of its development sleeve. Concretely, from the standpoint of keeping an image forming apparatus excellent in terms of the level of graininess in which it forms an image, the amount of developer per unit area of the peripheral surface of a development sleeve, on the downstream side of a developer regulation blade in terms of the rotational direction of the development sleeve, is desired to be set to a value in a range of (0.3±0.2) $mg/mm^2$ (=(30±20) $mg/cm^2$). More accurately, it is preferred that the amount by which developer is left coated on the peripheral surface of a development sleeve on the downstream side of the regulation blade is set in terms of the standardized specific gravity G (apparent thickness of developer coat). That is, the apparent thickness M/S of the developer coat on the peripheral surface of a development sleeve, in terms of specific gravity G, is desired to be in a range of 0.029-0.14 mm ((30±20) $mg/cm^2$/3.48 $mg/mm^3$)(M/S [$mg/mm^2$]/specific gravity (density) G [$mg/mm^3$])=0.029-0.14 mm ((30±20) $mg/cm^2$/3.48 $mg/mm^3$).

While a developing apparatus (device) is required to be less in the thickness of the developer on its development sleeve, there is a tendency that a developing device is further reduced in the gap between its development sleeve and regulation blade.

If the gap between a development sleeve and a regulation blade is rendered smaller than a certain value, such a problem is likely to occur that foreign substances, and the like, hang up in the adjacencies of the regulation blade and interfere with the developer coat on the development sleeve. Therefore, the gap between a development sleeve and a regulation blade is desired to be no less than 0.2 mm, preferably, no less than 0.3 mm.

On the other hand, reducing a developing sleeve in developer conveyance performance by imprudently reducing its grooves in depth, in order to allow the gap between the development sleeve and regulation blade to be widened, possibly makes the developer coat unstable, or causes the development sleeve to fail to be coated with the developer. Therefore, it is not desirable.

SUMMARY OF THE INVENTION

Thus, the primary object of the present invention, which relates to a developing device which employs a developer bearing member, the peripheral surface of which is provided with grooves, and is structured to form on the peripheral surface of the developer bearing member, a developer layer thin enough to yield an image of very high quality, is to provide a developing device which does not suffer from the problem that due to excessive or insufficient developer conveyance performance of a developer bearing member, the developer bearing member is unsatisfactorily coated with developer and/or foreign substances become stuck in the gap between the peripheral surface of the developer bearing member and the developer regulating member of the developing device.

Solution to the Problem

According to an aspect of the present invention, there is provided a developing apparatus comprising a developer carrying member for carrying a developer including toner and magnetic carrier to develop a latent image formed on said image bearing member, said developer carrying member including a surface having a plurality of grooves extending in a longitudinal direction; a magnet, provided inside said developer carrying member, for attracting the developer on the surface of said developer carrying member; a non-magnetic regulating member, provided spaced from said developer carrying member, for regulating an amount of the developer carried on said developer carrying member, wherein an amount M/S ($mg/mm^2$) of the developer carried on a unit area of said developer carrying member after passing by said regulating member, a gap SB (mm) between a free end of said regulating member and said developer carrying member, a density G ($mg/mm^3$) of the developer, and a groove ratio α which is a ratio of the grooves in the surface of said developer carrying member satisfy, $0.1 \leq M/S\ (mg/mm^2) \leq 0.5$, $0.2 \leq SB\ (mm)$, and $m/S\ (mg/mm^2) \times 1/4 \leq \alpha \times \{SB(mm)+D(mm)\} \times G(mg/mm^3) < M/S\ (mg/mm^2)$.

These and other objects, features, and advantages of the present invention will become more apparent upon consideration of the following description of the preferred embodiments of the present invention, taken in conjunction with the accompanying drawings.

DESCRIPTION OF THE EMBODIMENTS

Embodiment 1

Hereinafter, embodiments of the present invention are described in detail with reference to the appended drawings. However, the present invention is also applicable to various developing devices which are partially or entirely different in structure from those in the following embodiments, as long as they are equipped with a development sleeve or sleeves which are the same in shape and structure as those in the following embodiments.

That is, not only is the present invention applicable to a developing device, the development chamber and developer stirring chamber of which are horizontally aligned in tandem, but also, a developing device, the development chamber and developer stirring chamber of which are vertically aligned in tandem. Further, a developing device in accordance with the present invention is compatible with any image forming apparatus regardless of whether the image forming apparatus is of the tandem type or single drum type, whether the apparatus is of the intermediary transfer type or direction transfer type. Further, in the following description of the developing devices in accordance with the present invention, only the portions of the developing device, which are essential to the present invention, are described. However, with the addition of devices, equipment, frames, etc., the portions of the developing device in the embodiments of the present invention, which will be described hereafter, are usable as a part of a printer, a copying machine, a facsimile machine, and also, a multifunction machine.

Incidentally, the general structure in the image forming apparatus disclosed in the aforementioned Patent Document 1 are not shown in the appended drawings in order not to repeat the same description.

[Image Forming Apparatus]

Figure 1:
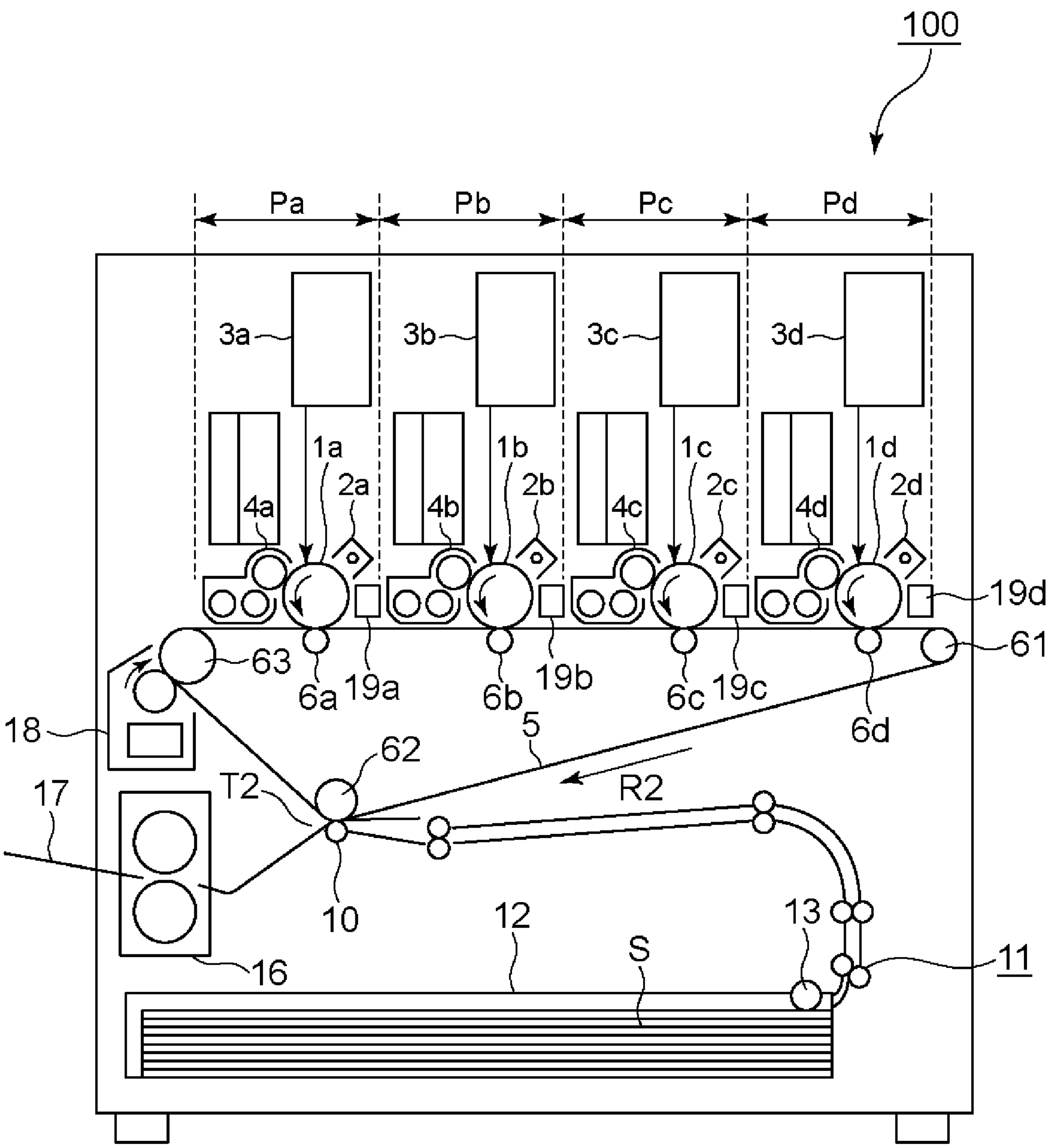
FIG. 1 is a schematic sectional view of the image forming apparatus in the first and second embodiments of the present invention, and shows the general structure of the apparatus.

FIG. 1 is a drawing for describing the general structure of a typical image forming apparatus with which the present invention is compatible. Referring to FIG. 1, an image forming apparatus 100 is a full-color printer of the tandem type, and also, of the intermediary transfer type. That is, the image forming apparatus 100 has image formation stations Pa, Pb, Pc and Pd, which form yellow, magenta, cyan and black toner images, one for one, and an intermediary transfer belt 5, along which the image formation stations Pa, Pb, Pc and Pd are aligned in tandem.

The intermediary transfer belt 5 is suspended by rollers 61, 62 and 63, and is movable in the direction indicated by an arrow mark R2. In the image formation station Pa, a yellow toner image is formed on a photosensitive drum 1*a*, and is transferred onto the intermediary transfer belt 5. In the image formation station Pb, a magenta toner image is formed on a photosensitive drum 1*b*, and is transferred onto the intermediary transfer belt 5. In the image formation stations Pc, and Pd, cyan toner image and black toner image are formed on photosensitive drums 1*c* and 1*d*, respectively, and are transferred onto the intermediary transfer belt 5.

After the transfer of four toner images, different in color, onto the intermediary transfer belt 5, the toner images are conveyed to the secondary transfer station T2, in which they are transferred onto a sheet S of recording medium. Meanwhile the sheets S of recording medium in a recording medium cassette 12 are moved out, by a pickup roller 13 from the cassette 12 while being separated one by one from the rest in the cassette 12, and are conveyed to a pair of registration rollers, which send the sheet S to the secondary transfer station T2, with such a timing that each sheet S arrives at the secondary transfer station T2 at the same time as the toner image on the intermediary transfer belt 5. After the transfer of the toner images onto the sheet S, the sheet S is subjected to heat and pressure, in a fixing device 16, so that the toner images are fixed to the surface of the sheet S. After the fixation of the toner images to the sheet S, the sheet Sis discharged into a delivery tray 17.

The image formation stations Pa, Pb, Pc and Pd are roughly the same in structure, although they are different in the color of the toner they use. Hereafter, therefore, only the image formation station P is described. The description of the image formation stations Pb, Pc and Pd is the same as that of the image formation station P, except for the suffix (b, c or d) of their referential code, which indicates the color of the toner they use.

The image formation station P has a photosensitive drum 1*a*. It has also a charging device 2*a* of the corona type, an exposing device 3*a*, a developing device 4*a*, a primary transfer roller 6*a*, and a drum cleaning device 19*a*, which are positioned in the adjacencies of the peripheral surface of the photosensitive drum 1*a*.

The photosensitive drum 1*a* is made up of an aluminum cylinder, and a negatively chargeable photosensitive layer formed on the peripheral surface of the photosensitive drum 1*a*. Itis rotated in the direction indicated by an arrow mark at a preset process speed. The charging device 2*a* of the corona type is for uniformly charging the peripheral surface of the photosensitive drum 1*a* to a preset negative polarity VD (which corresponds to potential level of unexposed areas of toner image). The exposing device 3*a* writes an electrostatic image of the image to be formed, on the uniformly charged portion of the peripheral surface of the photosensitive drum 1*a*, by scanning the uniformly charged portion of the peripheral surface of the photosensitive drum 1*a*, with a beam of laser light which it emits while deflecting the beam of laser light with its rotating mirror. The developing device 4*a* develops the electrostatic image on the peripheral surface of the photosensitive drum 1*a* into a toner image, with the use of developer, which is a mixture of toner and carrier.

The primary transfer roller 6*a* forms a transfer station between the photosensitive drum 1*a* and intermediary transfer belt 5, by being pressed upon the inward surface of the intermediary transfer belt 5. As positive DC voltage is applied to the primary transfer roller 6*a*, the negatively charged toner image on the photosensitive drum 1*a* is transferred (primary transfer) onto the intermediary transfer belt 5. The drum cleaning device 19*a* recovers the transfer residual toner, that is, the toner which failed to transfer onto a sheet S of recording medium, and therefore, is remaining on the peripheral surface of the photosensitive drum 1*a*.

The photosensitive drum 1*a* used as the image bearing member in this embodiment is an ordinary organic photosensitive member, which is in the form of a drum. However, the present invention is also compatible with an inorganic photosensitive member formed of such a photosensitive substance as amorphous silicon. Further, it is also compatible with a photosensitive member which is in the form of a belt. In other words, the following embodiments of the present invention are not intended to limit the present invention in scope. That is, the present invention is also compatible with various image forming apparatuses which are different in charging method, developing method, transferring method, cleaning method, and fixing method from those in the following embodiments of the present invention.

[Developing Device]

Figure 2:
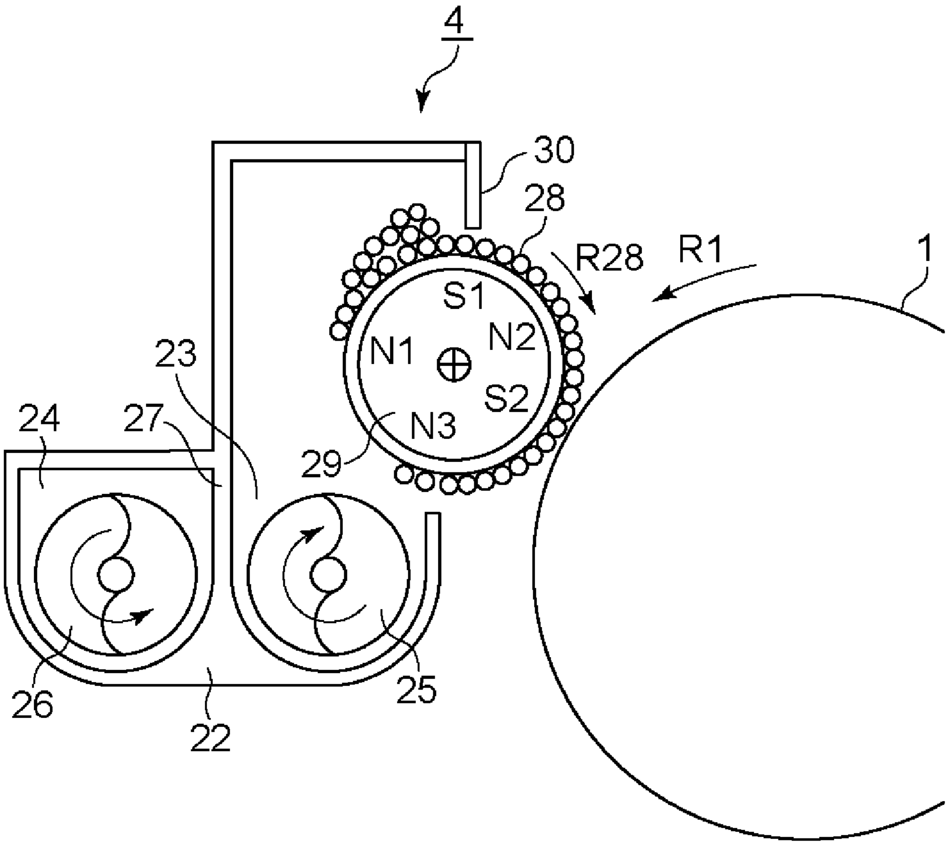
FIG. 2 is a schematic sectional view of a typical developing device to which the present invention is related, at a plane perpendicular to the axis of the development sleeve of the developing device.

Next, referring to FIG. 2, the developing device 4 in this embodiment is described in detail.

FIG. 2 is a schematic sectional view of the developing device in this embodiment, at a plane perpendicular to the lengthwise direction of the device. It is for describing the structure of the device. Referring to FIG. 2, the developing device 4*a* has a development sleeve 28 as a developer bearing member, which bears the developer made up of toner and magnetic carrier, to develop an electrostatic image on the photosensitive drum 1*a*. The photosensitive drum 1*a* rotates in the direction indicated by an arrow mark R1 at a process speed (peripheral velocity) of 273 mm/sec. The developing device 4*a* uses two-component developer, which is a mixture of nonmagnetic toner and magnetic carrier.

The developing means container 22 of the developing device 4*a* has a development chamber 23 for supplying the development sleeve 28 with developer, and a stirring chamber 24 for recovering the developer from the development sleeve 28. The two chambers 23 and 24 are positioned side by side in tandem. The development sleeve 28 is rotatably positioned in the area of the developing means container, which opposes the photosensitive drum 1*a*.

The development chamber 23 and developer stirring chamber 24, which are the two chambers created by dividing the developing means container with a partitioning wall 27, make up a circular passage through which developer is conveyed while being stirred. The two chambers 23 and 24 are positioned side by side, and are provided with a rotatable development screw 25, and a stirring screw 26, respectively. The development screw 25 and stirring screw 26 circularly move the developer in the developing means container 22 by conveying the developer in the opposite direction from each other.

The development sleeve 28 is made of a nonmagnetic substance such as aluminum or stainless steel. The photosensitive drum 1*a* is 80 mm in diameter. The smallest distance between the development sleeve 28 and photosensitive drum 1*a*, in the development station, is roughly 300 μm. That is, the developing device is structured so that as the developer is conveyed to the development station, the developer is made to crest in a form of a brush (magnetic brush), which comes into contact with the peripheral surface of the photosensitive drum 1*a*, being thereby enabled to develop an electrostatic image on the peripheral surface of the photosensitive drum 1*a*. The peripheral surface of the development sleeve 28 is provided with grooves which extend in the lengthwise direction of the development sleeve 28, being thereby increased in the amount by which it can convey developer (which hereafter may be referred to simply as "developer conveyance performance").

In the development station, the development sleeve 28 rotates in the same direction (indicated by arrow mark R28 in FIG. 1) as the moving direction of the peripheral surface of the photosensitive drum 1*a*. The peripheral velocity ratio of the development sleeve 28 relative to the photosensitive drum 1*a* is 1.75. The greater in peripheral velocity ratio relative to the photosensitive drum 1*a* the development sleeve 28, the higher the development efficiency. However, if it is excessive, it is likely for toner to be scattered, and also, for developer deterioration or the like problem to occur. Therefore, the peripheral velocity ratio of the development sleeve 28 relative to the photosensitive drum 1*a* is desired to be in a range of 0.5-2.0.

In the case of a developing method which uses two-component magnetic brush, the magnetic carrier in two-component developer is held to the peripheral surface of the development sleeve 28 by being confined by the magnetic flux of a magnetic roller 29. The negatively charged toner is electrostatically adhered to the positively charged carrier on the peripheral surface of the development sleeve 28. Thus, a "magnetic brush" is effected on the peripheral surface of the development sleeve 28. Thus, a latent image on the peripheral surface of the photosensitive drum 1*a* is developed into a visible image by providing a preset amount of difference in potential level between the DC voltage to be applied to the development sleeve 28 and the electrostatic latent image on the peripheral surface of the photosensitive drum 1*a*.

In order to improve the developing device in development efficiency (ratio by which toner is adhered to electrostatic image), a combination of a DC voltage of −500 V, and an AC voltage which is 1,300 V in peak-to-voltage (Vpp=1,300 V), and 12 kHz in frequency (f=12,000 Hz) is applied as development voltage to the development sleeve 28. Generally speaking, the application of AC voltage to a development sleeve increases the development sleeve in development efficiency, which enables an image forming apparatus to output an image of higher quality. However, it tends to cause toner to adhere to the unexposed portions of the electrostatic latent image; it tends to cause an image forming apparatus to output a foggy image. Therefore, a certain amount of difference in potential level is provided between the DC voltage to be applied to the development sleeve 28, and the potential level (which corresponds to background portion (white area) of image) to which the peripheral surface of the photosensitive drum 1*a* is to be charged, in order to prevent toner from being adhered to the unexposed portion of the latent image. Incidentally, this embodiment is not intended to limit the present invention in terms of the combination of the DC and AC voltages to be applied to the development sleeve 28.

<Toner>

The developer used by the developing device in this embodiment is two-component developer made up of dielectric nonmagnetic toner, and magnetic particles (carrier). The nonmagnetic toner is desired to be no less than 10 μm in weigh average particle diameter. The nonmagnetic toner used in this embodiment was color copier toner which was 8 μm in weight average particle diameter.

It is assumed here that the weight average particle diameter of toner is M, and toner particle diameter is r. In order to form a color image which is as vivid as possible, it is desired that no less than 90% in weight of toner satisfies an inequality: $\frac{1}{2}M<r<\frac{2}{3}M$, and no less than 99% in weight of toner satisfies an inequality: $0<<2M$.

As examples of the bonding resin used as the material for toner, there are styrene copolymer such as styrene-acrylate-ester resin and styrene-methacryate-ester resin, or polyester resin. However, in consideration of the fixing of color toners, which occurs when the unfixed color image is fixed, polyester resin is preferable because it desirably melts.

The true specific gravity of toner was measured with the use of an automatic densimeter of the dry type, more specifically, AccuPyc 1330 (product of Shimazu Co., Ltd.). The method used to measure the true specific gravity of the toner is the same as the method (which will be described later) used to measure the true specific gravity of the carrier.

<Magnetic Carrier>

As for the magnetic carrier, it is desired to be in a range of 25-50 μm in average particle diameter (50% particle diameter: D50) based on volume distribution standard. The magnetic carrier used in this embodiment was 35 μm in volume average particle diameter. As such carrier, pure ferrite particles (Cu—Zn ferrite which is roughly 230 emu in maximum magnetization), or those thinly coated with resin, is desirable.

The average particle diameter (50% particle diameter: D50) based on volume distribution standard is measured with the use of a multi-image analyzer (product of Beckman-Caulter Co., Ltd.) as will be described next.

Particle size distribution was obtained with the use of a particle size distribution measuring apparatus of the laser diffraction/dispersion type, more specifically, Microtrack MT3300 EX (product of Nikkiso Co., Ltd.), fitted with a sample supplying device of the dry type, more specifically, one shot sample conditioner of the dry type Turbotrack (product of Nikkiso Co., Ltd.). The vacuum source for feeding Turbotrack with magnetic carrier was a dust collector, which was set to roughly 33 liter/sec in airflow volume, and 17 kPa in pressure. It was automatically controlled by a software. The particle diameter was obtained as 50% particles diameter (D59), which is a cumulative value based on volume distribution. The apparatus is controlled by a software (version 10.3.3-203D) which came with the apparatus, and so is the analysis of the results of the measurement. The details of the condition under which the particles size was measured are as follows:

SetZero time: 10 seconds
Length of measurement time: 10 seconds
Number of measurement: 1
Index of particle refraction: 1.81
Particle shape: non-spherical
Measurement top limit: 1208 μm
Measurement bottom limit: 0.243 μm
Ambience: normal in temperature and humidity (23° C., 50% RH)

The true specific gravity of the magnetic carrier was measured with the use of an automatic densimeter of the dry type, more specifically, AccuPyc 1330 (product of Shimazu Co., Ltd.). To begin with, a magnetic carrier sample was left unattended for 24 hours in an ambience which is 23° C. in temperature and 50% in relative humidity. Then, 5 g of the sample was precisely measured, and was placed in a measurement cell (10 $cm^3$), and then, the cell was inserted into the sample chamber of the main assembly of the densimeter. Then, the densimeter was started. As the densimeter was started, the true specific gravity of the sample was automatically measured.

As the densimeter was started, the air in the sample chamber was purged 10 times with helium gas, which was adjusted in pressure to 20.000 psig ($2.392\times10^2$ kPa). Then, the helium gas was repeatedly purged until the change in the internal pressure of the sample chamber settled at 0.005 psig ($3.447\times10^2$ kPa/min). Then, the internal pressure of the sample chamber was measured. The test sample volume can be obtained from the change in internal pressure of the sample chamber, which occurs as the sample chamber settles in the state of equilibrium in terms of internal pressure (Voil's law). The true specific gravity of the test sample can be calculated with the use of the following equation:

True specific gravity of test sample (g/$cm^3$)=mass (g) of test sample/volume ($cm^3$) of test sample.

As for the carrier choice, resinous magnetic carrier made up of binder resin and oxide of magnetic or nonmagnetic metal may be used. One of the characteristic features of resinous magnetic carrier is that it is smaller in the maximum magnetization than ferrite particle, being roughly 190 emu/$cm^3$. Therefore, when the resinous magnetic carrier is used as the magnetic carrier, magnetic interference among adjacent magnetic brushes is less than when ferrite particles are used. Therefore, the developing device can be higher in magnetic brush density and less in magnetic brush height. Thus, resinous magnetic carrier can enable an image forming apparatus to output an image which is more uniform and finer in texture, and higher in resolution, than the ferrite particles.

[Developer Bearing Member (Development Sleeve)]

Next, the development sleeve 28 is described in detail.

The developing device is provided with a nonrotational magnetic roller 29, which is positioned in the hollow of the development sleeve 28. The peripheral surface of the magnetic roller 29 is provided with multiple (four in this embodiment) magnetic poles N1, S1, S2 and N3. The magnetic roller 29 is positioned so that its magnetic pole S2 opposes the photosensitive drum 1*a*, in the development station; the magnetic pole S1 opposes the regulation blade 30 as a development layer thickness regulating member; the magnetic pole N2 is positioned between the magnetic poles S1 and S2; and the magnetic poles N1 and N3 face the development chamber 23 and stirring chamber 24, respectively. Each magnetic pole was in a range of 40 mT-70 mT in magnetic flux density. However, the magnetic pole S2 which is for development was set to 100 mT in magnetic flux density.

The development sleeve 28 rotates in the direction indicated by an arrow mark R28. The regulation blade 30, which is for regulating in thickness the developer layer on the development sleeve 28, is positioned on the upstream side of the development area, in which the development sleeve 28 opposes the photosensitive drum 1*a*. The regulation blade 30 regulates in thickness the developer layer on the development sleeve 28, by trimming the tip portion of the magnetic brush on the peripheral surface of the development sleeve 28.

The regulation blade 30 is a long and narrow piece of nonmagnetic metallic plate (aluminum plate), which is positioned so that its lengthwise direction is parallel to the lengthwise direction of the development sleeve 28. After being borne by the development sleeve 28, the developer is conveyed through the gap between the regulating edge of the regulation blade 30 and the peripheral surface of the development sleeve 28. The thickness of the regulation blade 30 in this embodiment was 1.2 mm.

The amount by which the developer borne on the development sleeve 28 is conveyed by the rotation of the development sleeve 28 can be adjusted by the adjustment of the gap between the regulating edge of the regulation blade 30 and the peripheral surface of the development sleeve 28. In this embodiment, the amount by which the developer was allowed to remain coated on the peripheral surface of the development sleeve 28 per unit area was adjusted to 0.3 mg/$mm^2$ (=30 mg/$cm^2$). From the standpoint of the graininess of an image, the amount of the developer, per unit area of the peripheral surface of the development sleeve 28, on the downstream side of the regulation blade 30 in terms of the rotational direction of the development sleeve 28, is desired to be in a range of (0.3±0.2) $mg/mm^2$ (=30±20 $mg/cm^2$). In reality, the amount by which the developer is allowed to remain coated on the peripheral surface of the development sleeve 28 is affected by the specific gravity G ($mg/mm^3$) of the developer. Therefore, in order to properly indicate the amount of the developer on the development sleeve 28, on the downstream side of the regulation blade, the amount should be expressed in the apparent thickness (mm) of the developer layer (thickness (mm)=M/S ($mg/mm^2$))/(specific gravity G ($mg/mm^3$)). In this embodiment, from the standpoint of the graininess of an image, the apparent thickness (mm) to which the developer is allowed to remain coated on the peripheral surface of the development sleeve 28 is desired to be set to a value in a range of 29-140 μm, preferably, 43-129 μm. In other words, the gap SB is desired to be set to such a value that the amount M/S of developer, per unit area of peripheral surface of the development sleeve, on the downstream side of regulation blade 30, will be in a range of (0.3±0.15) $mg/mm^2$ (=(30±15) $mg/cm^2$): (M/S=(0.3±0.15) $mg/mm^2$ (30±15) $mg/cm^2$). If the gap SB is no more than the lowest value in the above given range, the amount (MS) by which the developer is left coated on the peripheral surface of the development sleeve 28 is excessively small, and therefore, the nonuniformity in the thickness of the developer coat is likely to affect the developing device (image forming apparatus) in the image quality in terms of uniformity. On the other hand, if the gap SB is no less than the top limit, the developing device (image forming apparatus) is likely to output an image which suffers from the graininess which is attributable to the rubbing of the peripheral surface of the peripheral surface of the photosensitive drum 1*a* by the tip portion of a magnetic brush.

If it is necessary to increase the developing device in development efficiency, the developing device has to be increased in the gap SD, that is, the gap between the development sleeve 28 and photosensitive drum 1*a*. However, if the gap SD is simply reduced, the peripheral surface of the photosensitive drum 1*a* is rubbed by the magnetic brush, in the development station. Thus, it becomes likely for an acceptably grainy image to be outputted. Thus, the developing device is reduced in the amount M/S by which the developer is allowed to remain coated on the development sleeve 28. With the amount M/S being smaller, even if the gap SD between the development sleeve 28 and photosensitive drum 1*a* is reduced to improve the developing device in development efficiency, it is unlikely for the toner image on the photosensitive drum 1*a* to be rubbed by the magnetic brush on the peripheral surface of the development sleeve 28. Thus, the developing device (image forming apparatus) is likely to output a high quality image.

As for the gap between the regulation blade 30 and development sleeve 28, it is desired to be no less than 0.2 mm, because if the gap between the regulation blade 30 and development sleeve 28 is small (no more than 0.2 mm), foreign substances or the like are likely to become stuck in the gap, and affect the developing device (image forming apparatus) in image quality, as described in the preceding paragraphs related to the prior art.

However, a developing device equipped with a development sleeve, the peripheral surface of which is provided the grooves, is likely to be higher in developer conveyance performance. Therefore, it is likely to be made smaller in the gap between its regulation blade 30 and development sleeve 28.

On the other hand, if a developing device is reduced in the depth of its grooves to reduce it in developer conveyance performance, it can be increased in the gap between its development blade 30 and development sleeve 28. However, if it is imprudently reduced in the gap between the regulation blade 30 and development sleeve 28, the developer coat on the development sleeve 28 is likely to become unstable.

Therefore, the developing device has to be increased in the gap between the regulation blade 30 and development sleeve 28 while keeping its development sleeve 28 stable in developer conveyance performance at a proper level.

The developer layer thickness regulation blade 30 may be a magnetic blade made of magnetic plate alone, or a bonded combination of nonmagnetic and magnetic plates. However, in the case where a plain magnetic blade is used as the regulation blade 30, developer tends to collect in the adjacencies of the regulation blade 30 because of the effect of the magnetic plate. Thus, the development sleeve 28 is reduced in its developer conveyance performance, which in turn makes it possible to increase the gap between the regulation blade 30 and development sleeve 28. However, as the developer collects in the adjacencies of the magnetic plate (regulation blade), it tends to deteriorate. This is why it is desired that the gap between the regulation blade 30 and development sleeve 28, but a blade made of magnetic plate alone or a combination of nonmagnetic and magnetic plates is not used as the regulation blade 30.

Thus, the inventors of the present invention studied the correlation between the developer conveyance performance of the development sleeve 28 and the shape of the grooves with which the peripheral surface of the development sleeve 28 is provided. The results of the studies are as follows:

The studies by the inventor revealed that there is a strong correlation between the developer conveyance performance of the development sleeve 28 and the groove ratio α, which is the "ratio of the portion of the peripheral surface of the development sleeve 28 occupied by the grooves, relative to the entirety of the peripheral surface of the development sleeve 28". In a case where the grooves are parallel to the lengthwise direction of the development sleeve 28, the groove ratio α can be expressed as the ratio of the sum of the width of all the grooves, relative to the circumference of the development sleeve 28 at a plane perpendicular to the axis of the development sleeve 28. In particular, referring to FIG. 3, in a case where the grooves with which the peripheral surface of the development sleeve 28 is provided are the same in the shape of their cross section, and are uniform in interval (preset periodicity P), the groove ratio α can be expressed in the form of the following equation, wherein W stands for the groove width, and P stands for the distance between the center of a given groove and that of the immediately adjacent groove.

$$\text{Groove ratio } \alpha = W/P \qquad (1)$$

When the radius of the development sleeve 28 is r, and the number of the grooves with which the peripheral surface of the development sleeve 28 is provided is N, the groove interval P can be expressed as $2\pi r/N$ ($P=2\pi r/N$).

That there is a strong correlation between the developer conveyance performance of the development sleeve 28 and the groove ratio α means that it is the portion of the peripheral surface of the development sleeve 28, which is occupied with the grooves, that contributes to the developer conveyance, and the portion of the peripheral surface of the development sleeve 28, which is not occupied with the grooves contributes little to the developer conveyance. In other words, as long as the groove is in such a shape that it can capture, and retain, a certain amount of the developer, more specifically, the magnetic particles, it contributes to developer conveyance regardless of its depth or the like properties. Thus, it is reasonable to say that the developer conveyance performance of the development sleeve 28 has a strong correlation with the groove width W, not the cross section, nor depth, of the groove.

Figure 4:
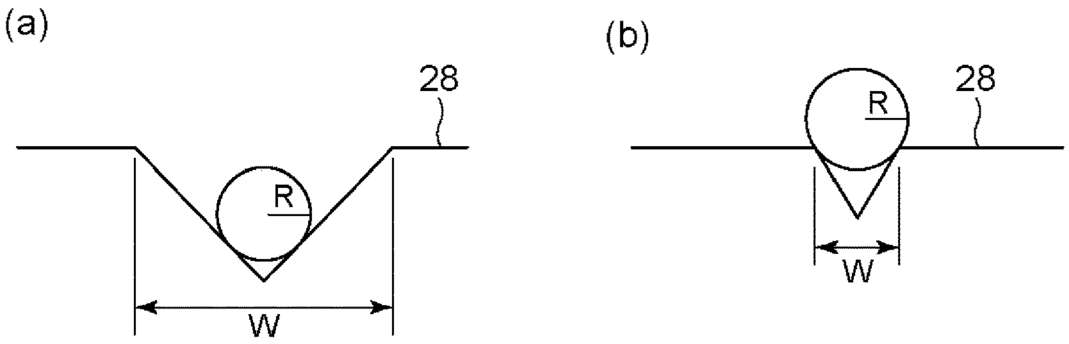
FIG. 4 is an enlarged schematic sectional view of one of the grooves of the development sleeve of the developing device to which the present invention relates, and is for illustrating the shape of the groove.
Figure 5:
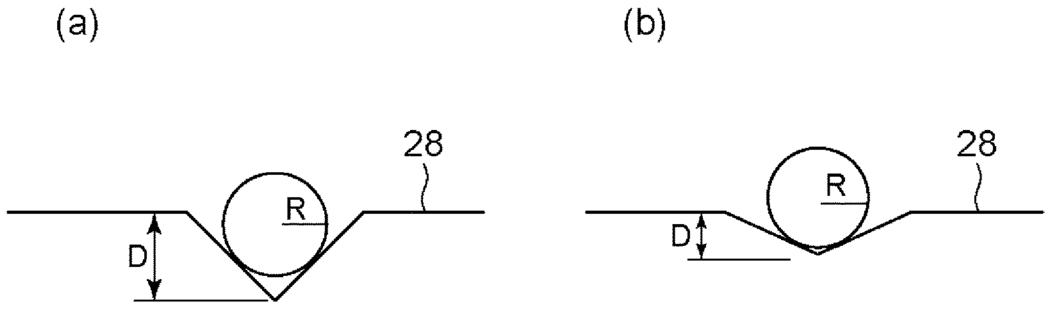
FIG. 5 is an enlarged schematic sectional view of one of the grooves of the development sleeve of the developing device to which the present invention relates, and is for illustrating the shape of the groove.

However, as a prerequisite for the above described correlation to hold true, the groove has to be such that it can capture and retain a certain amount of the developer. In order for the groove to be able to capture and retain the developer, the groove has to be able to capture and retain a certain amount of the magnetic carrier, which is the carrier of the toner. In order for the groove to be able to capture and retain a certain amount of the magnetic carrier, the groove width W has to be greater than the diameter 2R of the magnetic carrier particle, as shown in FIG. 4(*a*). If the groove width W is less than the magnetic carrier particle diameter 2R, the magnetic carrier particle does not fit in the groove, and therefore, the groove cannot capture and retain magnetic carrier (particles), regardless of the groove depth D. Further, the groove depth D has to be greater than at least the magnetic carrier particle radius R as shown in FIG. 5(*a*). Next, referring to FIG. 5(*b*), if the groove depth D is less than the magnetic carrier particle radius R, the magnetic carrier particle does not fit deep enough for the groove to capture and retain the magnetic particles, and therefore, is likely to slip away. Therefore, the relationship among the groove width W, groove depth D, magnetic carrier particle diameter 2R, and magnetic carrier particle radius R, has to satisfy the following Inequalities 2 and 3. Further, the groove width W is desired to be no more than ten times (20R) the magnetic carrier diameter (2R). If the groove width W is greater than 20R, it is unlikely for the carrier particle to remain captured in the groove. Therefore, it is possible that the effect of the groove upon the developer conveyance performance of the development sleeve 28 will not be fully realized.

$$20R>W>2R \tag{2}$$

$$D>R \tag{3}$$

Figure 6:
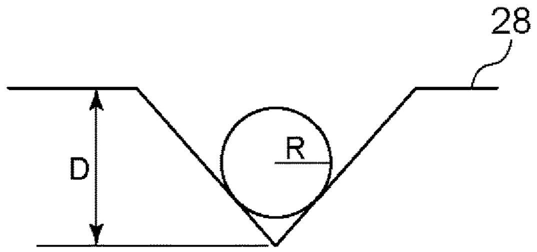
FIG. 6 is an enlarged schematic sectional view of one of the grooves of the development sleeve of the developing device to which the present invention relates, and is for illustrating the shape of the groove.

As long as the groove depth D is greater than the magnetic carrier particle radius R, it is assured that the magnetic carrier particle captured by the groove remains in the groove. However, if the groove depth D is made greater than the magnetic carrier particle diameter 2R as shown in FIG. 6, the entirety of the magnetic carrier particle fits in the groove, making it virtually impossible for the magnetic carrier particle to slip out of the groove. Thus, its is preferred that the groove is made so that its depth D is greater than the magnetic carrier particle diameter 2R (D>2R).

As for the grooveless portion of the peripheral surface of the development sleeve 28, it is desired to smooth a portion of the peripheral surface of the development sleeve 28, because if the grooveless portion is rough, there is no clear difference between the grooved portion and grooveless portion in terms of developer conveyance performance, which reduces the present invention in effectiveness. Thus, the surface roughness Ra (centerline average roughness) of the grooveless portion of the peripheral surface of the development sleeve 28 is desired to be no more than 0.5 (Ra≤0.5), preferably, no more than 0.25 (Ra<0.25). The definition of the centerline average roughness Ra is in JISB0601. The surface roughness Ra of the peripheral surface of the development sleeve 28 was measured with the use of a surface roughness gauge of the contact type, more specifically, a Surfcorder SE-3300 (product of Kosaka Laboratory Ltd.). The condition under which the surface roughness Ra was measured was 0.8 mm in cutoff value, 2.5 mm in measurement length, 1.0 mm/sec in conveyance speed, and 5,000 times in magnification.

The precondition for the presence of the correlation between the developer conveyance performance of the development sleeve 28 and the groove ratio α is that a magnetic brush can be formed on the peripheral surface of the development sleeve 28 in such a manner that magnetic carrier particles are made by their magnetic force to form strings (chains) of magnetic carrier particles, which extend from the magnetic particles which were captured by the groove of the development sleeve 28, and are remaining therein. With the above-described formation of the magnetic brush, the entirety of the magnetic brush is conveyed with the magnetic carrier particles in the groove, enhancing thereby the development sleeve 28 in developer conveyance performance. All that is necessary for the magnetic brush to be formed as described above is that the magnetic roller 29 is in the hollow of the development sleeve 28 as in this embodiment, for example. With the presence of the magnetic roller 29 in the hollow of the development sleeve 28, magnetism is induced in the magnetic carrier by the magnetic field of the magnetic roller 29. However, if the magnetic roller 29 is smaller in magnetic flux density $|B|(=(Br^2+B\theta^2+Bz^2)^{1/2}$ than a certain value, the magnetic brush is not formed. Thus, the area between the regulation blade 30 and development sleeve 28 needs to be greater in magnetic flux density |B| than a certain value. As long as the area between the regulation blade 30 and development sleeve 28 is no less than 10 mT, the magnetic brush is formed. Therefore, the effects of the present invention, which will be described next, are realized.

As long as the above described condition is met, the base portion of the magnetic brush is captured by the groove of the development sleeve 28. Therefore, as the development sleeve 28 rotates, the entirety of the magnetic brush is conveyed. That is, as long as the above described condition is met, the grooved portion of the peripheral surface of the development sleeve 28 contributes the developer conveyance. Whether or not the magnetic brush is conveyed by the development sleeve 28 depends upon whether the base portion of the magnetic brush is captured and remains captured by the groove. That is, all that is necessary is that the abovementioned condition is met, that is, the groove is deep enough, relative to the magnetic carrier particle radius R, for the magnetic carrier particle to be captured and remain captured by the groove. In other words, it does not mean that simply increasing the groove in depth guarantees that the development sleeve 28 is increased in developer conveyance performance. On the other hand, increasing the groove in width increases the number of the magnetic brushes which will be captured, and remain captured, by the groove. Therefore, the development sleeve 28 increases in developer conveyance performance. In other words, these findings concur with the conclusion to which the inventors of the present invention reached, that is, the conclusion that it is with the groove ratio α, which can be expressed in the form of the ratio α of the portion of the peripheral surface of the development sleeve 28, which is occupied with the grooves, relative to the entirety of the peripheral surface of the development sleeve 28, that the developer conveyance performance of the development sleeve 28 has a strong correlation, not the groove depth D or cross section of the groove.

Therefore, it is possible to reversely deduce that the development sleeve 28 can be controlled in developer conveyance performance by the adjustment of its groove ratio α. That is, by adjusting the development sleeve 28 in groove with D while ensuring that the groove can still capture and retain the magnetic carrier particle, it is possible to adjust the development sleeve 28 in developer conveyance performance without causing the developer coat on the development sleeve 28 to become unstable.

Next, the present invention, the object of which is to provide a developing device which is wider in the gap between its regulation blade 30 and development sleeve than a conventional developing device is described, while taking into account the above described findings and deductions.

As described above, the presence of a strong correlation between the developer conveyance performance and groove ratio α of the development sleeve 28 means that the grooved portion of the peripheral surface of the development sleeve 28 is higher in terms of the contribution to the developer conveyance performance than the grooveless portion of the peripheral surface of the development sleeve 28; the grooveless portion of the development sleeve 28 is not as high in developer conveyance performance as the groove portion.

If it is assumed that it is only the grooved portion that conveys the developer, the estimated maximum amount per unit area (10 mm×10 mm) by which the developer is conveyed through the gap between the regulation blade 30 and development sleeve 28 can be expressed in the form of the following mathematical formula (Formula 4). "Only the grooved portion conveys the developer" means that it is only the portion of the developer on the peripheral surface of the development sleeve 28*k*, which makes up the magnetic brush, that is conveyed by the development sleeve 28. Further, the "estimated maximum amount" means the amount by which the developer is conveyed by the development sleeve 28 when the space between the grooved portion of the peripheral surface of the development sleeve 28 and the regulation blade 30 is filled up with the developer. It is thought that, in reality, the developer which is conveyed by the grooved portion of the development sleeve 28 while the groove portion is moved past the regulation blade 30, is not the entirety of the developer which occupies the space between the grooved portion of the development sleeve 28 and the regulation blade 30. That is, it is thought that a part of the developer which occupies the above described space is not the developer which is being conveyed by the grooved portion. In this embodiment, however, the maximum amount per unit area by which the developer is conveyable by the development sleeve 28 is estimated assuming that the entirety of the developer in the abovementioned space is conveyed by the groove portion.

$$10\ \text{mm}\times 10\ \text{mm}\times\alpha\times\{SB\ (\text{mm})+D\ (\text{mm})\}\times G\ (\text{mg/mm}^3) \quad (4).$$

Figure 7:
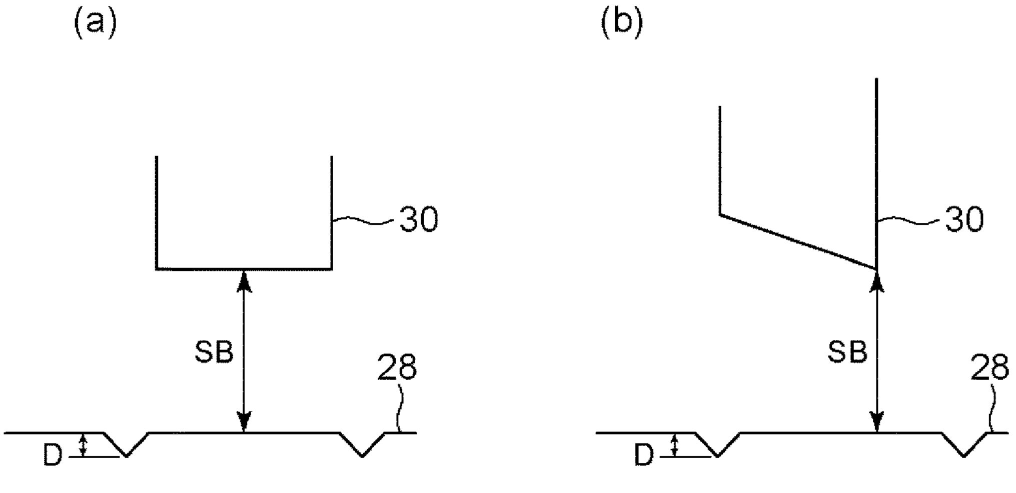
FIG. 7 is an enlarged schematic sectional view of the gap between the development sleeve of the developing device to which the present invention relates, and the regulation blade of the device, and is for illustrating the gap.

Here, the groove ratio α is the ratio of the sum of the grooved portions of the peripheral surface of the development sleeve 28, relative to the entirety of the peripheral surface of the development sleeve 28. Therefore, the ratio of the grooved portion per unit area (10 mm×10 mm) is 10 mm×10 mm×α. Referring to FIG. 7(*a*), "SB" stands for the gap between the regulation blade 30 and development sleeve 28, more accurately, the gap between the regulating side of the regulation blade 30 and the grooveless portion of the peripheral surface of the development sleeve 28. Next, referring to FIG. 7(*b*), in a case where the regulating side of the regulation blade 30 is tilted relative to the peripheral surface of the development sleeve 28, "SB" stands for the gap between the closer edge of the regulating side of the regulation blade 30 and the development sleeve 28. "D" stands for the groove depth. Thus, the height of the space between the grooved portion of the peripheral surface of the development sleeve 28 and the regulation blade 30 is expressed as (SB+D). Thus, if it is assumed that only the grooved portion of the peripheral surface of the development sleeve 28 conveys the developer, the volume, per unit area, by which the developer is moved through the gap SB between the regulation blade 30 and development sleeve 28 is expressed as (10 mm×10 mm×α×(SB+D)). It is primarily the groove shape that the height (SB+D) is affected. Here, therefore, it is assumed that the groove is rectangular in cross section. However, even if the groove is V-shaped, U-shaped, or in a shape different from V-shape or U-shape, as long as (SB+D) is used as the height of the above described space, it does not occur that the height is underestimated, admittedly that it is possible the amount by which the developer is conveyed by the development sleeve 28 will be slightly overestimated. Here, it is desired to estimate the maximum amount by which the developer is conveyed by the development sleeve 28. Therefore, the height may be left as (SB+D) regardless of groove shape.

"G" stands for the specific gravity of the developer. Thus, the value obtained by multiplying the abovementioned volume by G is the amount by which the developer is conveyed by the development sleeve 28. Therefore, the amount by which the developer is conveyed by the development sleeve 28 can be calculated with the use of the above-mentioned Formula 4. Since the developer in this embodiment is primarily a mixture of toner and magnetic carrier, the specific gravity of the developer G can be expressed in the form of the following Equation 5, in which "C and T" stand for the specific gravities of the magnetic carrier and toner, respectively, and "P" and "(P−1)" stand for the weight ratios of the toner and magnetic carrier, respectively, in the developer:

$$G=1/\{(1-P)/C+P/T\} \quad (5).$$

The value obtainable from Formula 4 is the estimated maximum amount by which the grooved portion of the peripheral surface of the development sleeve 28 can convey the developer. These formulas, equations, and inequalities concur with the results of the experiments which will be described later. In reality, the actual developer amount M/S, per unit area (10 mm×10 mm), on the downstream side of the regulation blade 30 is sometimes greater than the value obtained by Formula 4. That is, there are cases where the following Inequality 6 is satisfied. That is, there are cases in which the amount by which the developer is conveyed by the grooved portion alone is smaller than the actual amount by which the developer is conveyed by the development sleeve 28:

$$10\ \text{mm}\times 10\ \text{mm}\times\alpha\times\{SB\ (\text{mm})+D\ (\text{mm})\}\times G\ (\text{mg/mm}^3)<M/S\ (\text{mg/mm}^2)\times 10\ \text{mm}\times 10\ \text{mm} \quad (6).$$

The left side of Inequality 6 is the estimated maximum amount by which the developer is conveyed by the grooved portion of the peripheral surface of the development sleeve 28. Thus, in a case where the Inequality 6 is satisfied, the amount by which the developer is conveyed by the groove portion of the development sleeve 28 is smaller than the amount M/S of the developer on the development sleeve 28, on the downstream side of the regulation blade 30. That is, the grooveless portion also contributed to the developer conveyance. Therefore, in a case where Inequity 6 is satisfied, the gap between the development sleeve 28 and regulation blade 30 can be increased by the amount equivalent to the amount by which the developer is conveyed by the grooveless portion, which is less in developer conveyance performance than the grooved portion. On the contrary, in a case where Inequality 6 is not satisfied, the developer can be conveyed by the amount which matches the developer amount M/S on the development sleeve 28, by the grooved portion of the development sleeve 28. In this case, the grooved portion of the development sleeve 28 is rather high in developer conveyance performance. Therefore, it is mostly by the groove portion of the development sleeve 28 that the developer is conveyed by the amount which matches the amount M/S of the developer on the development sleeve 28. Therefore, it is likely that the gap between the development sleeve 28 and regulation blade 30 has to be extremely reduced.

Inequality 6 can be replaced with Inequality 6':

$$\alpha\times\{SB+D\}\times G<M/S \quad (6').$$

The value of M/S, which is the amount of the developer on the peripheral surface of the development sleeve 28 per unit area (10 mm×10 mm) is obtained with the use of the following method. That is, first, a mask is prepared, which matches in curvature the peripheral surface of the development sleeve 28 and has an opening of a preset size (50 mm×10 mm, in case of experiments performed by inventors of the present invention). Then, the developer on the peripheral surface of the peripheral surface of the development sleeve 28 is recovered through the opening of the mask while keeping the mask fitted around the development sleeve 28. Then, the weight of the recovered developer is measured. Then, the value of M/S is obtained by converting the obtained weight of the recovered developer into the amount of developer per unit area (10 mm×10 mm) (In case of inventors of present invention, value of M/S was obtained by dividing weight of recovered developer by 5).

The gist of the present invention is to adjust the groove ratio α to satisfy Inequality 6, in order to make it unnecessary for the gap SB between the development sleeve 28 and regulation blade 30 to be excessively narrowed, more specifically, to be reduced to no more than 0.2 mm.

Embodiment

Next, the present invention is concretely described with reference to the developing devices in the following embodiments of the present invention, along with comparative developing devices.

Figure 3:
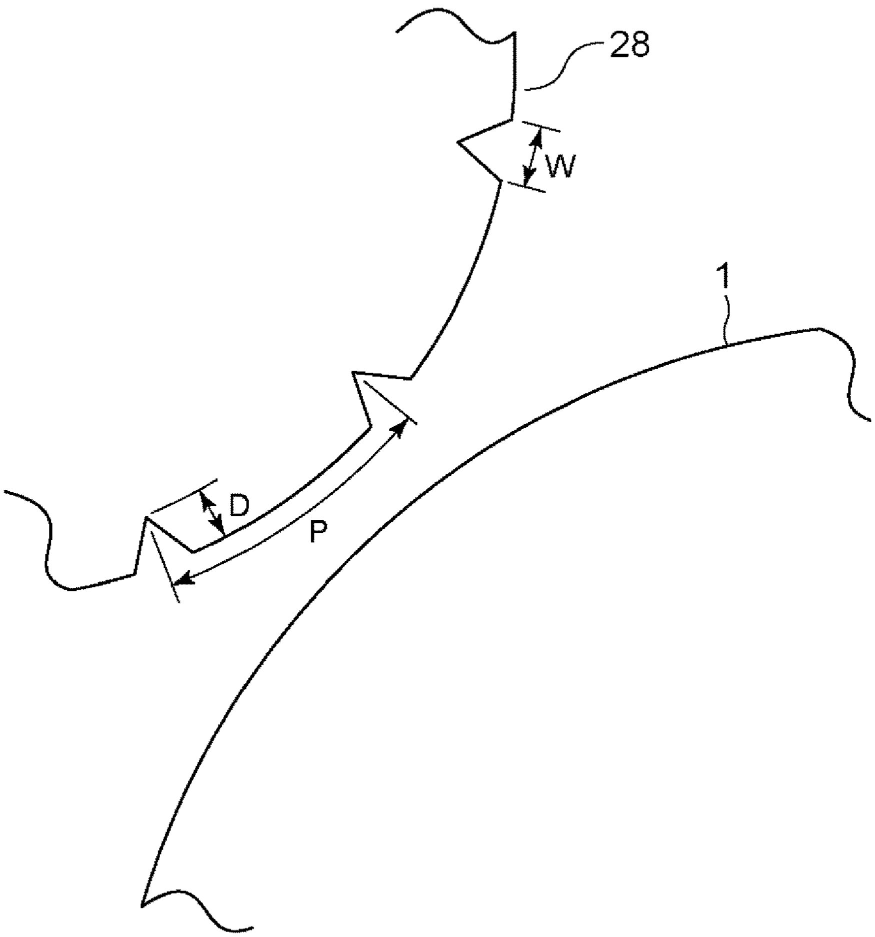
FIG. 3 is an enlarged sectional view of the interfacial area between the development sleeve, to which the present invention is related, and a photosensitive drum.

Shown in Table 1 are the results of the experiments carried out under various conditions to find out the relationship between the specification, in particular, the shape, of the groove in the peripheral surface of a development sleeve, and the development sleeve performance. Referring to Table 1, each development sleeve 28 used in the experiments was provided with multiple grooves which were V-shaped in cross section, and extended in the lengthwise direction of the development sleeve 28, with the provision of preset interval (groove pitch) in terms of the circumferential direction of the development sleeve 28, as shown in FIG. 3.

TABLE 1

| | Sleeve Dia. (mm) | No. | P (mm) | W (mm) | D (mm) | W/P | SB | Coating state |
|---|---|---|---|---|---|---|---|---|
| Emb.1 | 20 | 50 | 1.256 | 0.10 | 0.05 | 0.080 | E | E |
| Emb.2 | 20 | 50 | 1.256 | 0.12 | 0.06 | 0.096 | E | E |
| Emb.3 | 20 | 50 | 1.256 | 0.18 | 0.09 | 0.143 | G | E |
| Emb.4 | 20 | 80 | 0.785 | 0.18 | 0.09 | 0.229 | G | E |
| Comp.1 | 20 | 100 | 0.628 | 0.25 | 0.12 | 0.398 | N | E |
| Comp.2 | 20 | 200 | 0.314 | 0.12 | 0.06 | 0.382 | N | E |
| Emb.5 | 24.5 | 50 | 1.538 | 0.12 | 0.06 | 0.078 | E | E |
| Emb.6 | 20 | 25 | 2.512 | 0.10 | 0.05 | 0.040 | E | E |
| Emb.7 | 20 | 20 | 3.14 | 0.10 | 0.05 | 0.032 | E | G |

The developer used in the experiments was the above described mixture of toner, and magnetic carrier made of ferrite. The ratio in weight between the toner (P) and magnetic carrier (1−P) was 0.1 (=P) and 0.9 (=P−1). The toner and magnetic carrier were 1.0 mg/mm$^3$ and 4.8 mg/mm$^3$ in specific gravity. Thus, the specific gravity G of the developer was 3.48, which was obtained with the use of Equation 5. Further, the particle diameter of the magnetic carrier was 35 μm.

The developing device was set so that the amount M/S of developer on the peripheral surface of the development sleeve 28 would become 0.3 mg/mm$^2$ (=30 mg/cm$^2$), on the downstream side of the regulation blade 30 (M/S=0.3 mg/mm$^2$ (=30 mg/cm$^2$)). Then, each development sleeve in Table 1 was studied regarding the amount to which the gap (=SB) between the development sleeve 28 and regulation blade 30 can be set. The development sleeves which did not allow the gap SB to be set be no less than 0.2 mm was given "N", whereas the development sleeves which allowed the gap SB to be set to be no less than 0.2 mm were given "G". Further, the development sleeves which allowed the gap SB to be set to be no less than 0.3 mm was given "E". In each experiment, the condition of the developer coat on the development sleeve 28 was examined with naked eyes. The development sleeves having a uniform developer coat was given "E", and the development sleeves having a developer coat which was nonuniform enough to contribute to the formation of an unsatisfactory image was given "N". The development sleeves, the developer coat on which was slightly nonuniform, but not enough to contribute to the formation of an unsatisfactory image, were given "G".

Embodiment 1

The development sleeve in the first embodiment, which was 0.080 in groove ratio α (α=0.080), allowed the gap SB to be set to 0.45 mm. If the gap (SD) is 0.45 mm, the value the value obtained by substituting 0.45 (=SB) in Formula 4 (=left side of Inequality 6) is 13.9, which is less than half the desired amount M/S(=right side of Inequality 6) per unit area (10 mm×10 mm), which is 30 (=0.3×10×10). Thus, Inequality 6 is satisfied. That is, the amount by which the developer was conveyed past the regulation blade 30 by the grooveless portion was substantial in comparison to the amount by which the developer was conveyed past the regulation blade 30 by the groove portion. Therefore, it was possible for the gap SB to be set to roughly 0.45 mm. It may be reasonable to assume that this is the reason why it was possible for the gap SB to be set to roughly 0.45 mm.

Embodiment 2

When the development sleeve in the second embodiment, which was 0.096 in groove ratio α (α=0.096), was used, it was possible to set the gap SB to 0.35 mm. Thus, the value obtained by substituting 0.35 for SB in Formula 4 (=left side of Inequality 6) is 13.6, which is less than half the desired value 30 (=0.3×10×10) for the amount M/S(=right side of Inequality 6) per unit area (10 mm×10 mm). Thus, Inequality 6 is satisfied. That is, the amount by which the developer was conveyed past the regulation blade 30 by the grooveless portion was substantial in comparison to the amount by which the developer was conveyed past the regulation blade 30 by the groove portion. This seems to be the reason why it was possible for the gap SB to be set to roughly 0.35.

Embodiment 3

When the development sleeve in the third embodiment, which was 0.143 in groove ratio α (α=0.143), was used, it was possible for the gap SB to be set to 0.3 mm. Thus, the value obtained by substituting 0.3 for SB in Formula 4 (=left side of Inequality 6) is 19.4, which is smaller than 30 (=0.3×10×10) which is the desirable value for the amount M/S of the developer, per unit area (10 mm×10 mm) on the development sleeve 28. Thus, Inequality 6 was satisfied. Based on this fact, it is reasonable to assume that the developer was conveyed not only by the groove portion, but also, the grooveless portion. Therefore, it was possible to set the gap SB to 0.2 mm or greater. However, compared to the development sleeves in the first and second embodiments, the developer sleeve in this embodiment is greater in the amount by which the developer is conveyed by the groove portion, that is, it is smaller in the amount by which the developer was conveyed by the grooveless portion. Therefore, even though it was possible for the gap SB to be set to roughly 0.3 mm, which is obviously greater than 0.2 mm.

Embodiment 4

When the development sleeve in the third embodiment, which was 0.229 in groove ratio α (α=0.229), it was possible for the gap SB to be set to 0.2 mm. Thus, the value obtained by substituting 0.2 for SB in Formula 4 (=left side of Inequality 6) is 23.1, which is smaller than 30 (=0.3×10×10) which is the desirable value for the amount M/S of the developer, per unit area (10 mm×10 mm) on the development sleeve 28, and therefore, Inequality 6 was satisfied. Thus, it is reasonable to assume that the development sleeve conveyed the developer with the use of not only its groove portion, but also, the grooveless portion, and therefore, it was possible for the gap SB to be set 0.2 mm or greater. However, compared to the development sleeves in the first, second, and third embodiments, the developer sleeve in this embodiment is substantially greater in the amount by which the developer is conveyed by the groove portion. This seems to be the reason why the gap SB had to be set to the relatively small value of 0.2 mm.

Another reason why the gap SB had to be small in the case of the development sleeve in the fourth embodiment is that the groove pitch P of this development sleeve was small relative to the thickness of the regulation blade 30. More specifically, the groove pitch P of the development sleeve in the fourth embodiment was 0.785 mm (P=0.785 mm), and the thickness B of the regulation blade 30 was 1.2 (B=1.2 mm). That is, the groove pitch P (0.785) is smaller than the thickness B (1.2 mm) of the regulation blade 30.

Figure 8:
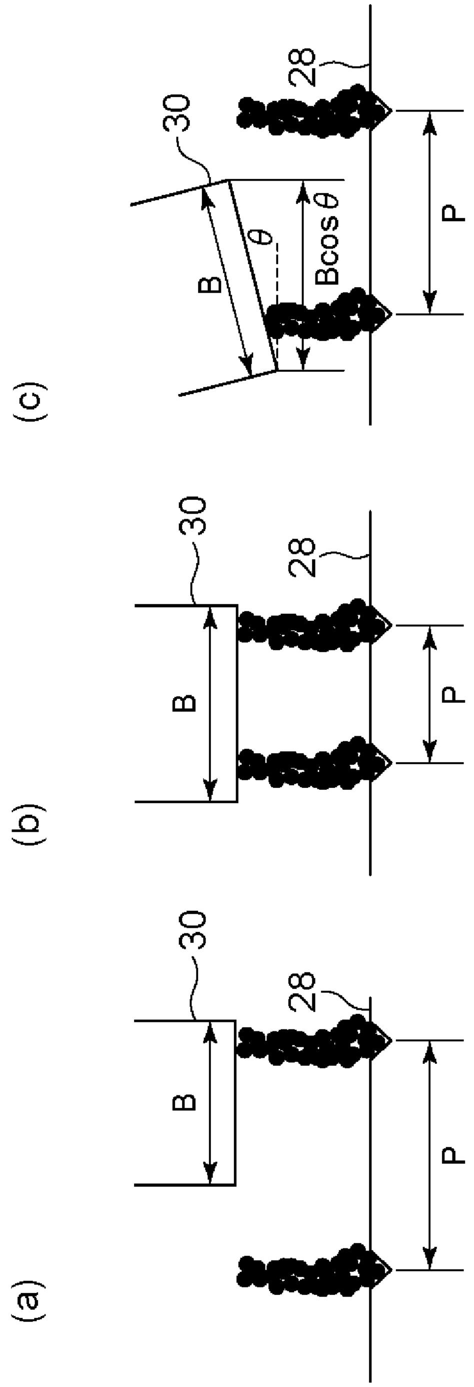
FIG. 8 is an enlarged schematic sectional view of one of the gap between the development sleeve of the developing device to which the present invention relates, and the regulation blade of the device, and is for illustrating the relationship between the groove pitch of the development sleeve and the thickness B of the regulation blade.

In a case where the groove pitch P is smaller than the thickness B of the regulation blade 30, it sometimes occurs that two or more grooved portions are simultaneously moved past the regulation blade 30, creating thereby a space sandwiched by the two magnetic brushes extending from the grooved portions, as shown in FIG. 8(*b*). The developer in the space between by the two magnetic brushes has no place to escape, and therefore, is likely to be subjected to mechanical and magnetic force by the magnetic brushes. Thus, even the grooveless portion is likely to increase in developer conveyance performance. Therefore, it is desired that the groove pitch P is made to be greater than the thickness B of the regulation blade 30, as shown in FIG. 8(*a*), in order to prevent two or more grooved portions from simultaneously moving past the regulation blade 30.

Referring to FIG. 8(*c*), even in a case where the surface of the regulation blade 30, which faces the development sleeve 28, is angled by θ relative to the peripheral surface of the development sleeve 28, an effect similar to the above described one will occur as long as the groove pitch P is greater than the length (Bos θ) of the projection of the surface of the regulation blade 30, which faces the development sleeve 28, upon the peripheral surface of the development sleeve 28.

Comparative Development Sleeve 1:

In the case of the first comparative development sleeve, which is 0.389 in groove ratio α (α=0.389), the gap (SD) could not be set to 0.2 mm or greater. The value obtained by substituting 0.2 mm for SB in Formula 4 (=left side of Inequality 6) is 44.3, which is greater than 30 (=0.3×10×10) which is the desirable value for the amount M/S of the developer, per unit area (10 mm×10 mm) on the development sleeve 28. Therefore, in order for Inequality 6 to be satisfied, the gap SB has to be no more than 0.2 mm. In reality, if M/S is 30, the gap SB is 0.17 mm. Therefore, the value of Formula 4 (=left side of Inequality 6) by substituting 0.17 for SB is 40.2, which is greater than 30 (=0.3×10×10) which is the desirable value for the amount M/S(=right side of Inequality 6) of the developer, per unit area (10 mm×10 mm) on the development sleeve 28. and therefore, Inequality 6 is not satisfied.

Comparative Development Sleeve 2:

In the case of the second comparative development sleeve, which was 0.382 in groove ratio α (α=0.382), the gap SB could not be set to 0.2 mm or greater. The value obtained by substituting 0.2 mm for SB in Formula 4 (=left side of Inequality 6) is 34.6, which is greater than 30 (=0.3×10×10) which is the desirable value for the amount M/S(=right side of Inequality 6) of the developer, per unit area (10 mm×10 mm) on the development sleeve 28. Therefore, in order for Inequality 6 to be satisfied, the gap SB has to be no more than 0.2 mm. In reality, if M/S is 30, the gap SB is 0.18 mm. Therefore, the value of Formula 4 (=left side of Inequality 6) obtained by substituting 0.18 for SB is 31.9, which is greater than 30 (=0.3×10×10) which is the desirable value for the amount M/S(=right side of Inequality 6) of the developer, per unit area (10 mm×10 mm), on the development sleeve 28. and therefore, Inequality 6 is not satisfied.

Figure 9:
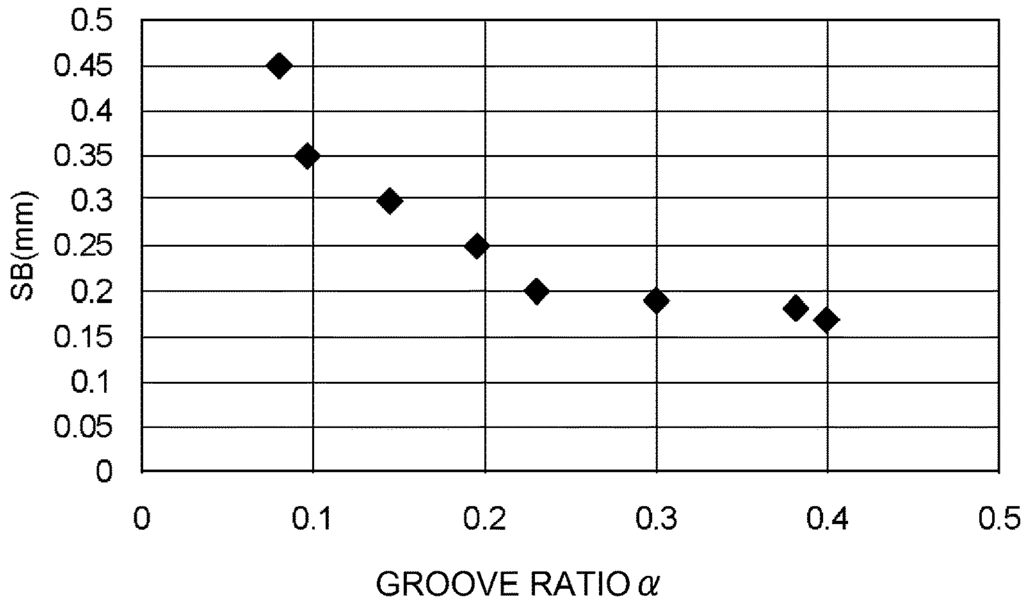
FIG. 9 is a table which shows the relationship between the groove ratio α and the gap SB between the regulation blade and development sleeve of the developing device in the first embodiment of the present invention, and a comparative developing device.

FIG. 9 is a graph which shows the relationship between the groove ratio α and SB when the development sleeves in the embodiments of the present invention, and comparative development sleeves, were used. The horizontal axis stands for the groove ratio α, and the vertical axis stands for SB, when M/S was set to 0.30. It is evident from this graph that there is a strong correlation between the groove ratio α and SB. Roughly speaking, reduction in groove ratio α allows the gap SB to be set wider. In particular, setting the groove ratio α to 0.229 or smaller allows the gap SB to be substantially greater. It was thought that this is possible because 0.229 is roughly the borderline value between where Inequality 6 can be satisfied and where Inequality 6 cannot be satisfied. In reality, the right side of FIG. 9, with reference to where the groove ratio α is 0.229, that is, where the groove ratio is greater than 0.229, does not satisfy Inequality 6, whereas the left side of FIG. 9, with reference to where the groove ratio α is 0.229, that is, where the groove ratio is less than 0.229, satisfies Inequality 6.

In a case where Inequality 6 is not satisfied, the developer is primarily conveyed by the grooved portion. Therefore, changing the gap SB changes the amount M/S. Therefore, if an attempt is made to increase SB by reducing the M/S by reducing the groove ratio α, M/S is restored to the original value as SB is slightly widened. That is, SB cannot be substantially widened. In reality, the right side of FIG. 9, where the groove ratio α is relatively large, indicates that increasing the groove ratio α does not allow SB to be substantially increased.

On the other hand, in a case where Inequality 6 is satisfied, the grooveless portion aggressively contributes to the developer conveyance. Therefore, changing SB does not significantly affect M/S. Therefore, even if an attempt is made to widen SB by reducing M/S by reducing groove ratio α, M/S does not restore to the original value, unless SB is substantially widened. Therefore, it is possible to widen SB. In reality, the left side of the graph in FIG. 9, with reference to where the groove ratio α is 0.229, that is, where Inequality 6 is satisfied, indicates that reduction in the groove ratio α allows SB to be significantly widened. That is, in this embodiment, the groove ratio α is desired to be no more than 0.229 (α≤0.229).

It is reasonable to deduce the following: as long as the value of Formula 4 is smaller than M/S, which is the amount of the developer on the peripheral surface of the development sleeve 28, on the downstream side of the regulation blade 30 in terms of the rotational direction of the development sleeve 28, that is, as long as the groove ratio α is set so that Inequality 6 is satisfied, the grooveless portion substantially contributes to developer conveyance. Therefore, even if M/S is smaller, SB can be set to be no less than 0.2 mm.

The desirable structural arrangement for a developing device is as follows: To begin with, in order to ensure that the developer is conveyed not only by the grooved portion, but also by the grooveless portion, the value of Formula 4 is desired to be no more than $\frac{23}{30}$ of the amount M/S (which is 30 mm/cm$^2$ in this embodiment) of the developer on the portion of the peripheral surface of the development sleeve 28, on the downstream side of the regulation blade 30. That is, referring to FIG. 9, in the fourth embodiment (groove ratio α=$\frac{23}{30}$), the value of Formula 4 is no more than $\frac{23}{30}$ (third embodiment: 19.4/30) of the desirable value for M/S (which is 30 in this embodiment). Thus, at least 7/30 can be conveyed by the grooveless portion, ensuring that SB can be widened. As for a more desirable range for SB, in a case where the value of Formula 4 is no more than $\frac{19}{30}$, relative to the amount M/S of the developer on the peripheral surface of the development sleeve 28, on the downstream side of the regulation blade 30, not only is it ensured that the developing device is placed in the state in which the grooveless portion also contributes to developer conveyance, but also, the ratio of the grooveless portion in terms of developer conveyance performance can be increased more. As a result, SB can be further widened. Therefore, it is desirable that the developer is conveyed by the grooveless portion as well as by the grooved portion. This embodiment is equivalent to a case in which α≤0.143. As long as the groove ratio α is in this range, the above described effects can be enhanced, which is desirable.

Further, referring to FIG. 9, where the groove ratio α is no more than 0.12 (α≤0.12), this embodiment can make SB roughly twice as wide as the SB for the first and second comparative development sleeves. Therefore, it is desirable that the groove ration a is no more than 0.12. In other words, as long as the groove ration a is set so that the value of Formula 4 becomes no more than $\frac{16}{30}$, relative to the desirable amount M/S for the developer on the portion of the peripheral surface of the development sleeve 28, on the downstream side of the regulation blade 30, effect which is roughly similar to the aforementioned effect is obtainable, which is desirable. In this case, the developing device can be satisfactorily increased in the ratio at which the developer is conveyed by the grooveless portion.

To describe further, in the case of the first and second embodiments, the value of Formula 4 becomes no more than half ($\frac{15}{30}$) the amount M/S (which is 30 in this embodiment) on the development sleeve 28, on the downstream side of the regulation blade 30, as indicated by Formula 7. Therefore, it was possible to further widen SB. This seems to be why it was possible for the developing device to be increased in the ratio at which the developer is conveyed by the grooveless portion, relative to the grooved portion, that is, the grooveless portion can be more aggressively used for developer conveyance.

$$10\ \text{mm}\times 10\ \text{mm}\times\alpha\times\{SB\ (\text{mm})+D\ (\text{mm})\}\times G\ (\text{mg/mm}^3)<M/S\ (\text{mg/mm}^2)\times 10\ \text{mm}\times 10\ \text{mm}/2 \quad (7).$$

The results of the experiment in which the development sleeve in the fifth embodiment, which was different in diameter from the preceding development sleeves, were also studied. They showed that the same results can be obtained regardless of the diameter of the development sleeve 28.

Embodiment 5

In a case where the development sleeve in the fifth embodiment, which was 0.078 in groove ratio α (α=0.078) was used, it was possible for the gap SB to be set to 0.40 mm. The value of Formula 4 (=left side of Inequality 6) obtained by substituting 0.4 for SB was 12.5, which is less than half the desirable value 30 (=0.3×10×10) for the amount M/S of the developer, per unit area (10 mm×10 mm) on the development sleeve 28, and therefore, Inequality 6 is satisfied. Therefore, it is reasonable to assume that while the developer was conveyed through the gap SB between the regulation blade 30 and development sleeve 28, no less than half the developer was conveyed by the grooveless portion. Therefore, it is reasonable that this was reason why it was possible for the gap SB to be set to roughly 0.4 mm.

Further, cases (embodiments 6 and 7) in which the development sleeve was even smaller in the groove ration a were also studied.

Embodiment 6

In a case where the development sleeve in the sixth embodiment, which was 0.040 in groove ratio α (α=0.040) was used, it was possible for the gap SB to be set to 0.5 mm (SB=0.5). The value of Formula 4 (=left side of Inequality 6) obtained by substituting 0.5 for SB in Formula 4 is 7.61, which is smaller than the desirable value or the developer amount M/S (=30), per unit area (10 mm×10 mm). Thus, Inequality 6 (7) was satisfied. Itis reasonable to think that this is why it was possible for the gap SB to be set to roughly 0.5 mm.

Embodiment 7

In a case where the development sleeve in the seventh embodiment, which was 0.032 in groove ratio α (α=0.032)

was used, it was possible for the gap SB to be set to 0.6 mm (SB=0.6). The value of Formula 4 (=left side of Inequality 6) obtained by substituting 0.6 for SB is 7.23, which is smaller than 30 (=0.3×10×10), or the desirable value for the developer amount M/S (right side of Inequality 6), per unit area (10 mm×10 mm). Thus, Inequality 6 (7) was satisfied. It is reasonable to think that this is why it was possible for the gap SB to be set to roughly 0.6 mm.

However, in the case of the seventh embodiment, the developer conveyance performance of the development sleeve 28 was at a level which creates no problem. But, the developer coat was slightly nonuniform. The reason for this problem seems to be that the ratio at which the developer was conveyed by the grooved portion was 7.23/30=0.241, which is less than ¼ of the entirety of the developer conveyed by the development sleeve 28. Thus, it is reasonable to think that the ratio at which the developer was conveyed by the grooveless portion was excessive, and therefore, the development sleeve 28 was affected in terms of developer conveyance performance. Thus, the value of Formula 4 is desired to be no less than ¼ of the desirable value for the developer amount M/S, as shown by Inequality 8:

$$10\ \text{mm}\times 10\ \text{mm}\times\alpha\times\{SB+D\}\times G\geq M/S/4 \quad (8).$$

Given in Table 2 are the results of the experiments in which the effects of the shape of the grooves in the peripheral surface of the development sleeve 28 upon the developer conveyance performance of the development sleeve 28 were studied with the use of development sleeves which were different in groove depth D and groove width W, as well as groove shape, from those in the first embodiment.

TABLE 2

| | Sleeve Dia. (mm) | No. | P (mm) | W (mm) | D (mm) | W/P | SB | Coating state |
|---|---|---|---|---|---|---|---|---|
| Emb.8 | 20 | 50 | 1.256 | 0.10 | 0.04 | 0.080 | E | E |
| Emb.9 | 20 | 50 | 1.256 | 0.10 | 0.03 | 0.080 | E | G |
| Comp.3 | 20 | 50 | 1.256 | 0.10 | 0.01 | 0.080 | E | N |
| Comp.4 | 20 | 50 | 1.256 | 0.03 | 0.04 | 0.016 | E | N |

The developer used in the experiments was the same as that used for the experiments, the results of which were given in Table 1. That is, its specific gravity G was 3.48 (G=3.48), and the particle diameter of the magnetic carrier was 35 μm.

Like the development sleeves used in the experiments, the results of which are given in Table 1, the developing device used for these experiments were set so that the developer amount M/S on the peripheral surface of the development sleeve 28, on the downstream side of the regulation blade 30 became 0.3 mg/mm$^2$ (=30 mg/cm$^2$). Then, the values to which the gap SB between the development sleeve 28 and regulation blade 30 could be set were studies for each of the development sleeve 28 listed in Table 2. Further, the state of the developer coat was also examined.

Embodiment 8

In a case where the development sleeve in the eighth embodiment, which was 0.080 in groove ratio α (α=0.080, it was possible for the gap SB to be set to 0.45 mm. The value of Formula 4 (=left side of Inequality 6) obtained by substituting 0.45 for SB was 13.6 which is less than half the desirable value 30 (=0.3×10×10) for the amount M/S of the developer, per unit area (10 mm×10 mm) on the development sleeve 28, and therefore, Inequality 6 (7 and 8) was satisfied. Thus, it is reasonable to assume that the grooveless portion contributes no less than half the amount by which developer was conveyed past the regulation blade 30 by the development sleeve 28, and therefore, it was possible for the gap SB to be set to roughly 0.45 mm.

Embodiment 9

In a case where the development sleeve in the ninth embodiment, which was 0.080 in groove ratio α (α=0.080) was used, it was possible for the gap SB to be set to 0.50 mm. The value of Formula 4 (=left side of Inequality 6) obtained by substituting 0.50 for SB was 14.7, which is less than half the desirable value 30 (=0.3×10×10) for the amount M/S of the developer, per unit area (10 mm×10 mm) on the development sleeve 28, and therefore, Inequality 6 was satisfied. Thus, it is reasonable to assume that while the developer is conveyed through the gap between the regulation blade 30 and development sleeve 28, no less than half the developer is conveyed by the grooveless portion, and therefore, it was possible for the gap SB to be set to roughly 0.50 mm.

However, in the case of the ninth embodiment, there was no problem regarding the developer conveyance performance of the development sleeve 28, but, a small amount of nonuniformity was detectable across the developer coat. The reason for this symptom seems to be attributable to the fact that because the grooves of the development sleeve 28 were 30 μm in depth D, which was less than the diameter 2R of the magnetic carrier particle, it was slightly less likely for the magnetic carrier particles be captured by the groove and remains captured in the groove, which affected the developer conveyance performance of the development sleeve 28. Thus, it is desired that the groove width W is greater than the particle diameter 2R of the magnetic carrier, as indicated previously by Inequality 2.

Comparative Development Sleeve 3:

In a case where the third comparative development sleeve 28, which was 0.080 in groove ratio α (α=0.080) was used, it was possible for the gap SB to be set to 0.6 mm, but, the developer coat on the development sleeve was unstable.

This symptom seems to suggest that because the groove depth D was 10 μm, which was less than the radius of the magnetic carrier particle, and therefore, the groove was extremely small in its ability to capture and retain the magnetic carrier particles, which affected the developer conveyance performance of the development sleeve 28. Thus, it is desirable that the groove depth D is greater than the radius R of the magnetic carrier particle, as indicated before by Inequality 3.

Comparative Development Sleeve 4:

In a case where the fourth comparative development sleeve, which was 0.016 in groove ratio (α=0.016) was used, it was possible for the gap SB to be set to 0.8 mm, but, the developer coat on the development sleeve was unstable.

This problem seems to be attributable to the following fact: Unlike the third comparative development sleeve, the fourth comparative development sleeve is 40 μm in the groove depth D, which is greater than the diameter 2R of the magnetic carrier particle, but, is 30 μm in groove width W, which is less than the diameter 2R of the magnetic carrier particle. Therefore, it was impossible for the magnetic carrier particle to fit in the groove in entirety. Therefore, it was less likely for the groove to capture and retain the magnetic carrier particle; the magnetic carrier particle is less likely to cling to the groove, which affected the developer conveyance performance of the development sleeve 28. Thus, the groove width W is desired to be greater than the diameter 2R of the magnetic carrier particle.

Up to this point, the cases in which the amount M/S of the developer on the peripheral surface of the development sleeve, per unit area, on the downstream side of the regulation blade 30 was 0.3 $mg/mm^2$ (=30 $mg/cm^2$) have been described. However, the description of the preceding cases holds true even if the developer amount M/S is not 0.3 $mg/mm^2$ (=30 $mg/cm^2$).

As described above, from the standpoint of the graininess of the image which the development sleeve develops, the developer amount M/S per unit area of the peripheral surface of the development sleeve is desired to be set to (0.3±0.2) $mg/mm^2$(=(30±20) $mg/cm^2$). More precisely, it is desired that the value (apparent thickness of developer coat)=(M/S ($mg/mm^2$)/specific gravity G ($mg/mm^3$)) obtained by standardizing, in terms of specific gravity, the amount of the developer coated on the development sleeve, on the downstream side of the regulation blade 30 falls in a range of 29-140 μm. In a case where M/S is set to a value within the abovementioned range, the value of the groove ratio α which makes it possible for the gap SB to be set to 0.2 mm or wider can be estimated as follows, with the use of Inequality 6. Since the smaller the developer amount M/S in value, the more difficult it is to satisfy Inequality 6. Thus, the groove ratio α is calculated assuming that M/S=0.1 $mg/mm^2$, and SB=200 μm. Further, as for the standardized groove depth D and groove width W, it was assumed that D=0.06 mm and G=3.5 $mg/mm^3$. Thus, Inequality 6 becomes: $10\times10\times\alpha\times(0.20+0.06)\times3.5<0.1\times10\times10$ Thus, α<0.1099.

Therefore, even if the deviation in groove depth, and specific gravity of the developer, are taken into consideration, Inequality 6 can be satisfied when M/S is set to a value within the range of (30±20) $mg/cm^2$.

Further, in a case where M/S and SB are set to 0.15 $mg/mm^2$ and 200 μm, respectively, for higher image quality, Inequality 6 becomes:

$$10\times10\times\alpha\times(0.20+0.06)\times3.5<0.15\times10\times10$$

Thus, α<0.1648.

Therefore, even if the deviation in groove depth, and the deviation in specific gravity of the developer, are taken into consideration, as long as the development sleeve is made to be less than 0.16 (α<0.16) in groove ratio, Inequality 6 can be satisfied even when M/S is set to a value within the range of (30±15) $mg/cm^2$ (which is advantageous from standpoint of preventing formation of image which is undesirably grainy and/or undesirably low in density).

Further, in a case where M/S is set to 0.15 $mg/mm^2$ for higher image quality, and SB is widened to 300 μm (M/S=0.15 $mg/mm^2$, SB=300 μm), Inequality 6 becomes:

$$10\times10\times\alpha\times(0.30+0.06)\times3.5<0.15\times10\times10$$

Thus, α<0.119.

Therefore, even if the deviation in groove depth and specific gravity of the developer, are taken into consideration, Inequality 6 can be satisfied even when M/S is set to a value within the range of (30±15) $mg/cm^2$ and the gap SB is widened to 300 μm or wider. Thus, it may be said that setting M/S to 0.15 $mg/mm^2$ is more desirable.

Based on the results of the experiments in which the sixth and seventh embodiments were tested, the groove ratio α is desired to be no less than 0.04. If the groove ratio α is no more than 0.04, that is, if it is excessively small, the development sleeve is insufficient in developer conveyance performance, which in turn makes the developer coat on the development sleeve unstable. Regarding the smallest value for the groove ratio α, the groove ratio α is desired to be no less than 0.06, preferably, 0.08, in order to ensure that the development sleeve is satisfactory in developer conveyance performance.

Further, the development sleeves in the above described embodiments of the present invention, were provided with V-shaped grooves. However, as described above, these embodiments are not intended to limit the present invention in terms of groove shape. That is, the present invention is compatible with a developing device structured as described above, regardless of the groove shape of its development sleeve. For example, the present invention is compatible with various developing devices, the development sleeve of which is shaped in the form of a letter U, rectangular, or complex in cross section, as long as the developing devices are structured as described above. However, in a case where a development sleeve is relatively low in groove ratio α, there is a problem that it is rather difficult to form the grooves U-shaped or rectangular in cross section.

Figure 10:
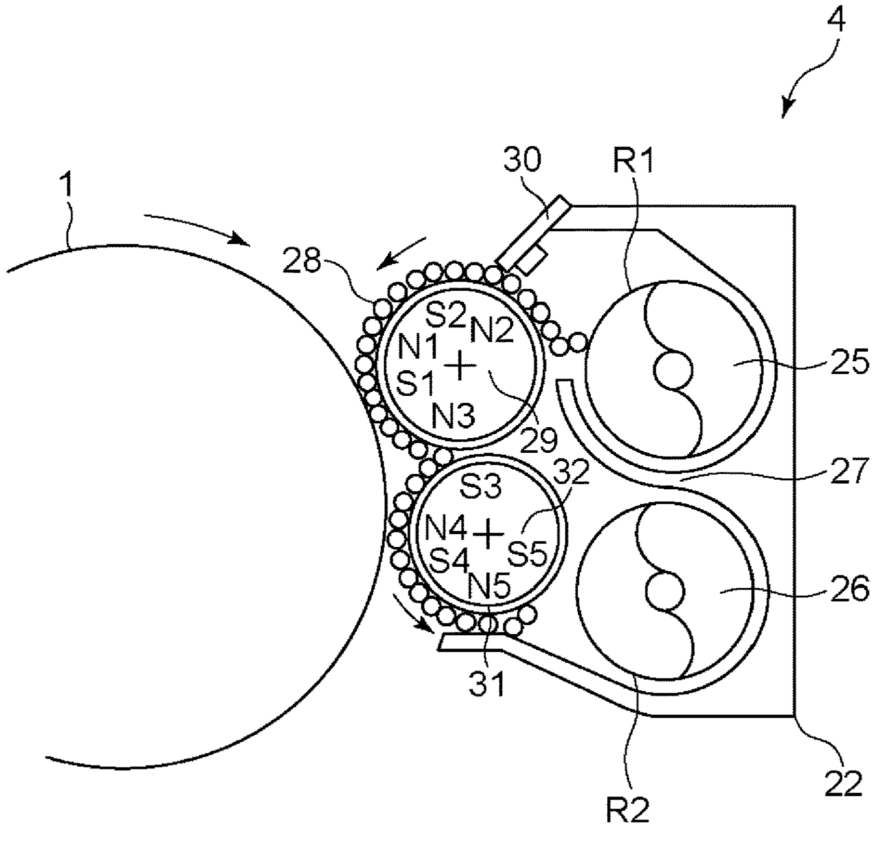
FIG. 10 is a schematic sectional view of a developing device in accordance with the present invention, which is different in structure from the one in the first embodiment of the present invention.

Further, the preceding embodiments of the present invention were described with reference to the cases in which the number of the development sleeve with which a developing device was provided was only one. However, the present invention is also applicable to a developing device provided with two or more development sleeves, for example, development sleeves 28 and 31, in which magnetic rollers 29 and 32, respectively, are positioned, as shown in FIG. 10. That is, descriptions similar to those given to the cases in which the developing devices had only one development sleeve are applicable to a developing device such as the one shown in FIG. 10, at least, to its development sleeve 28, next to the peripheral surface of which the regulation blade is positioned.

Embodiment 2

In the first embodiment of the present invention, the magnetic carrier was carrier made of pure ferrite. However, using resinous magnetic carrier, which is greater in resin ratio and smaller in the amount of magnetization than the conventional ferrite carrier can make a developing device output an image which is superior in the properties related to graininess, for the following reason, even when the degree at which it satisfies Inequality 6 is the same as the conventional magnetic carrier.

That is, if magnetic carrier is small in the amount of magnetization, the magnetic interaction (repellent force) between adjacent two magnetic brushes is smaller. Therefore, the magnetic brushes which the magnetic carrier forms on the peripheral surface of the development sleeve are shorter and are higher in density, allowing thereby developing device to output an image which is free of textural nonuniformity, and higher in resolution.

The magnetic brush length roughly equals the apparent thickness (=M/S ($mg/mm^2$)/specific gravity G ($mg/mm^3$)), which was mentioned in the description of the first embodiment. In reality, however, there is a small amount of distinct difference between the two, which is attributable to the developer density, because a magnetic brush formed of developer which is higher in density is likely to be greater in apparent length (height) than a magnetic brush formed of developer which is lower in density. Thus, the former is inferior to the latter, in that it is more likely to cause the formation of an undesirably grainy image, than the latter.

More specifically, in a case where developer which is less in density is used, magnetic brushes which the developer forms are shorter, that is, less in apparent length (height), and are higher in density. Therefore, an image which is higher in resolution and less grainy can be formed.

In this embodiment, therefore, resinous magnetic carrier, which is formed by dispersing magnetic metallic oxide (for example, magnetite) and nonmagnetic metallic oxide (for example, hematite) in binder resin, was used as the carrier for the developer.

More specifically, in this embodiment, resinous magnetic carrier which is roughly 190 emu/$cm^3$ in maximum magnetization, being therefore smaller in maximum magnetization than ferrite particles (280 emu/$cm^3$), was used. The specific gravity G of this resinous magnetic carrier was 4.0 mg/$mm^3$ which was less than the specific gravity G of the magnetic carrier in the first embodiment. The toner used in this embodiment was the same as the one used in the first embodiment. Further, the weight ratio between the toner and the resinous magnetic carrier was the same as that between the toner and conventional magnetic carrier in the first embodiment, and was 1:9. Thus, the specific gravity G of the developer in this embodiment, which is obtainable from Equation 5 is 3.08 (G=3.08).

This carrier was studied with the use of the same development sleeve as the one used for the first embodiment in Table 1.

Embodiment 10

In a case where the development sleeve in the first embodiment, which was 0.080 in groove ratio α was used, it was possible for the gap SB to be set to 0.50 mm. The value obtained by substituting 0.50 for SB in Formula 4 was 13.6, which is less than half the desired value (30) for the developer amount M/S. Therefore, Inequality 6 was satisfied. That is, the grooveless portion contributed more to the developer conveyance past the regulation blade 30 than the groove portion. It may be assumed that this is why it was possible for the gap SB to be set to roughly 0.50 mm.

Further, in terms of image quality related to graininess, the resinous magnetic carrier in this embodiment was superior to the conventional magnetic carrier in the first embodiment, which was formed of only ferrite particles.

This embodiment is not intended to limit the present invention in terms of magnetic carrier choice. That is, not only is the present invention compatible with the nonresinous magnetic carrier in this embodiment, which was formed by dispersing magnetic and non magnetic metallic oxides in binder resin, but also, with such resinous magnetic carrier that was made higher in resin ratio by the dispersion of resin in the gaps among porous carrier particles.

In order for the present invention to be as effective as possible, the carrier is desired to be no less than 210 emu/$cm^3$ in the amount of magnetization.

As for the method for calculating the amount of magnetization, the magnetic properties of the carrier were obtained with the use of an automatic magnetic properties recording apparatus of the oscillatory magnetic field type (product of Riken Instrumentation Ltd.). More specifically, the carrier packed in a cylindrical container and placed in an external magnetic field which was 1 KOe (kilo elsted) was measured in the strength of the magnetization. Then, the obtained strength of magnetization of the carrier was multiplied by the true specific gravity of the carrier to calculate the magnetization amount (emu/$cm^3$) of the carrier.

According to the present invention, in a developing device which employs a developer bearing member, the peripheral surface of which is provided with grooves, and is structured to form on the peripheral surface of the developer bearing member, a developer layer thin enough to yield an image of very high quality, it is possible to provide a developing device which suppresses the problem that due to excessive or insufficient developer conveyance performance of a developer bearing member, the developer bearing member is unsatisfactorily coated with developer and/or foreign substances that become stuck in the gap between the peripheral surface of the developer bearing member and the developer regulating member of the developing device.

While the invention has been described with reference to the structures disclosed herein, it is not confined to the details set forth, and this application is intended to cover such modifications or changes as may come within the purposes of the improvements or the scope of the following claims.

INDUSTRIAL APPLICABILITY

The present invention provides a developing device which suppresses the problem that due to excessive or insufficient developer conveyance performance of a developer bearing member, the developer bearing member is unsatisfactorily coated with developer and/or foreign substances become stuck in the gap between the peripheral surface of the developer bearing member and the developer regulating member of the developing device.

The invention claimed is:

1. A developing apparatus for developing a latent image formed on an image bearing member comprising:

a developer carrying member configured to carry a developer including toner and magnetic carrier, said developer carrying member including a developer carrying surface having a plurality of grooves;

a magnet, provided inside said developer carrying member, configured to attract the developer on said developing carrying surface; and a regulating member, provided spaced from said developer carrying member, configured to regulate an amount of the developer carried on said developer carrying surface, wherein an amount M/S (mg/mm2) of the developer carried on a unit area of said developer carrying surface after passing by said regulating member, a gap SB (mm) between a free end of said regulating member and said developer carrying member, a depth D (mm) of said grooves, a density G (mg/mm3) of the developer, and a groove ratio α which is a ratio of said grooves in said developer carrying surface satisfy, $0.1 \le M/S\ (mg/mm2) \le 0.5$, $0.2 \le SB\ (mm)$, $\frac{1}{4} \times M/S\ (mg/mm2) \le \alpha \times \{SB(mm)+D(mm)\} \times G(mg/mm3) < M/S\ (mg/mm2)$, $0.06 \le \alpha$ wherein said magnet includes a pole at a position opposing said regulating member, and wherein the pole is in a range of 40 mT to 70 mT in magnetic flux density.

2. An apparatus according to claim 1, wherein $0.06 \le \alpha \le 0.229$.

3. An apparatus according to claim 2, wherein $0.08 \le \alpha$.

4. An apparatus according to claim 2, wherein $\alpha < 0.16$.

5. An apparatus according to claim 2, wherein $\alpha < 0.10$.

6. An apparatus according to claim 2, wherein said grooves having V-like sections.

7. An apparatus according to claim 1, wherein $0.3 \leq SB$ (mm), $\alpha < 0.119$.

8. An apparatus according to claim 1, wherein said regulating member includes a magnetic member.

9. An apparatus according to claim 1, wherein said regulating member is a non-magnetic member.

10. An apparatus according to claim 1, wherein said regulating member comprises magnetic and non-magnetic members.

11. An apparatus according to claim 1, wherein a thickness B (mm) of said regulating member and a pitch P (mm) of said grooves satisfy, B (mm)<P (mm).

* * * * *